US012776920B2

(12) United States Patent
Shin

(10) Patent No.: US 12,776,920 B2
(45) Date of Patent: Oct. 27, 2026

(54) CROSS-CERTIFICATION METHOD AND DEVICE FOR CHARGING ELECTRIC VEHICLE

(71) Applicants: Hyundai Motor Company, Seoul (KR); Kia Corporation, Seoul (KR); Myongji University Industry and Academia Cooperation Foundation, Yongin (KR)

(72) Inventor: Min Ho Shin, Yongin (KR)

(73) Assignees: Hyundai Motor Company, Seoul (KR); Kia Corporation, Seoul (KR); Myongji University Industry and Academia Cooperation Foundation, Yongin (KR)

( * ) Notice: Subject to any disclaimer, the term of this patent is extended or adjusted under 35 U.S.C. 154(b) by 621 days.

(21) Appl. No.: 18/039,168

(22) PCT Filed: Nov. 29, 2021

(86) PCT No.: PCT/KR2021/017789
§ 371 (c)(1),
(2) Date: Dec. 4, 2023

(87) PCT Pub. No.: WO2022/114903
PCT Pub. Date: Jun. 2, 2022

(65) Prior Publication Data

US 2024/0121110 A1 Apr. 11, 2024

(30) Foreign Application Priority Data

Nov. 27, 2020 (KR) ........................ 10-2020-0162249
Nov. 26, 2021 (KR) ........................ 10-2021-0165824

(51) Int. Cl.
*H04L 9/32* (2006.01)
*H04L 9/08* (2006.01)
*H04L 9/30* (2006.01)

(52) U.S. Cl.
CPC ............ *H04L 9/3263* (2013.01); *H04L 9/088* (2013.01); *H04L 9/30* (2013.01)

(58) Field of Classification Search
CPC ... H04L 9/3268; H04L 9/3265; H04L 9/3263; H04L 63/0823; H04L 67/12; B60L 53/66
See application file for complete search history.

(56) References Cited

U.S. PATENT DOCUMENTS 10,375,057 B2 * 8/2019 Bhattacharya ........ H04L 9/3268
10,547,457 B1 * 1/2020 Duccini .................... H04L 9/50
(Continued)

FOREIGN PATENT DOCUMENTS

EP 3 699 019 A1 8/2020
KR 10-2018-0086934 A 8/2018
(Continued)

OTHER PUBLICATIONS

"Exploring the Public Key Infrastructure for ISO 15118 in the EV Charging Ecosystem", ElaadNL, Arnhem, The Netherlands, Nov. 2018, 88 pages.
(Continued)

*Primary Examiner* — Tae K Kim
(74) *Attorney, Agent, or Firm* — Fox Rothschild LLP

(57) ABSTRACT

An authentication method and device enable a charging station to verify a contract certificate of an electric vehicle based on a cross certificate when the charging station is not equipped with an MO RootCA certificate. An electric vehicle authentication method for providing plug-and-charge charging to the electric vehicle in the charging station includes: transmitting, to the electric vehicle, an SECC
(Continued)

certificate chain including an SECC certificate and at least one charging device family SubCA certificate and receiving a verification result for the SECC certificate from the electric vehicle; receiving a contract certificate chain including a contract certificate from the electric vehicle; and verifying the cross certificate based on a predetermined RootCA certificate to obtain a public key of a charging operator RootCA or a charging operator SubCA included in the cross certificate and verifying the contract certificate based on an obtained public key.

8 Claims, 13 Drawing Sheets

(56) References Cited

U.S. PATENT DOCUMENTS

| | | | | |
|---|---|---|---|---|
| 11,642,977 | B2 * | 5/2023 | Bhargava | B60L 53/53 320/109 |
| 11,997,487 | B2 * | 5/2024 | Louis | H02J 50/10 |
| 2011/0140835 | A1 | 6/2011 | Ishibashi | |
| 2016/0352521 | A1 * | 12/2016 | Choi | H04L 9/3247 |
| 2017/0111178 | A1 * | 4/2017 | Winkelvos | H04W 12/0431 |
| 2017/0346639 | A1 * | 11/2017 | Muftic | H04L 9/3247 |
| 2018/0262339 | A1 * | 9/2018 | Kazin | H04L 9/14 |
| 2020/0280842 | A1 * | 9/2020 | Liu | H04W 4/44 |
| 2020/0282859 | A1 * | 9/2020 | Shin | B60L 53/66 |
| 2022/0069602 | A1 * | 3/2022 | Shin | B60L 53/305 |
| 2022/0158851 | A1 * | 5/2022 | Shin | G06Q 50/40 |
| 2022/0212559 | A1 * | 7/2022 | Shin | H04L 9/3263 |
| 2023/0057752 | A1 * | 2/2023 | Shin | B60L 53/66 |
| 2024/0010095 | A1 * | 1/2024 | Shin | B60L 53/34 |
| 2024/0380612 | A1 * | 11/2024 | Shin | G06Q 50/40 |
| 2026/0039481 | A1 * | 2/2026 | Shin | H04L 9/3247 |

FOREIGN PATENT DOCUMENTS

| | | | | | |
|---|---|---|---|---|---|
| KR | 10-2020-0124621 | A | | 11/2020 | |
| KR | 10-2020-0126339 | A | | 11/2020 | |
| WO | WO-2020218810 | A1 | * | 10/2020 | H04L 9/321 |

OTHER PUBLICATIONS

"Root certificate—Wikipedia", Feb. 9, 2019, "https://en.wikipedia.org/w/index.php?title=Root_certificate&oldid=824641858", 2 pages.

S. Lee et al., "A Study on the Application of Cross-Certification Technology for the Automatic Authentication of Charging Users in ISO 15118 Standard", The Journal of Society for a e-Business Studies, 25(2), pp. 1-14 (May 2020).

International Search Report issued Mar. 3, 2022 in corresponding PCT Application No. PCT/KR2021/017789 (English Translation).

Lee, S. et al., "A Study on the Application of Cross-Certification Technology for the Automatic Authentication of Charging Users in ISO 15118 Standard", The Journal of Society for e-Business Studies, vol. 25, No. 2, May 2020, pp. 1-14, https://doi.org/10.7838/jsebs.2020.25.2.001.

Mültin, M. "the Basics of Plug & Charge", published Nov. 15, 2020, Switch.

* cited by examiner

Contract Certificate Chain #1: {CPO Sub-CA 1 cert., CPO Sub-CA 2 cert., Contract cert.}
Contract Certificate Chain #2: {cross-cert., CPO Sub-CA 1 cert., CPO Sub-CA 2 cert., Contract cert.}

Contract Certificate Chain #1: {CPO Sub-CA 1 cert., CPO Sub-CA 2 cert., Contract cert.}
Contract Certificate Chain #3: {cross-cert., CPO Sub-CA 2 cert., Contract cert.}

Contract Certificate Chain #4: {CPO Sub-CA 1 cert., Contract cert.}
Contract Certificate Chain #5: {cross-cert., Contract cert.}

CROSS-CERTIFICATION METHOD AND DEVICE FOR CHARGING ELECTRIC VEHICLE

CROSS-REFERENCE TO RELATED APPLICATIONS

The present application is a U.S. National Phase application under 35 U.S.C. § 371 of International Application No. PCT/KR2021/017789 filed on Nov. 29, 2021, which claims under 35 U.S.C. § 119(a) the benefit of Korean Patent Application No. 10-2020-0162249 filed on Nov. 27, 2020, and Korean Patent Application No. 10-2021-0165824 filed on Nov. 26, 2021, the entire contents of which are incorporated by reference herein.

BACKGROUND

1. Technical Field

The present disclosure relates to an authentication method and device for charging an electric vehicle, more particularly, to the method and device for authenticating a device based on a public key infrastructure.

2. Description of Related Art

An electric vehicle (EV) is driven by an electric motor powered by a battery and has advantages of reducing pollutants such as exhaust gas and noise, less breakdown, longer life, and simpler driving operation compared with a conventional combustion engine vehicle. An electric vehicle charging system may be defined as a system that charges a battery mounted in an electric vehicle using electric power obtained from a commercial power grid or stored in an energy storage device. Such an electric vehicle charging system may be implemented in various forms. For example, the electric vehicle charging system may include a conductive charging system using a cable or a non-contact wireless power transfer system.

A charging station starts the charging for an EV after performing an authentication process. ISO 15118-1, which is one of the international standards for EV charging, specifies two authentication methods: a PnC mechanism allowing an automatic authentication and payment using a contract certificate stored in the EV, and an authentication using external identification means (EIM) such as a credit card, a debit card, cash, and a smartphone application. The PnC mechanism refers to plug-and-charge scheme, in case of a conductive charging, by which the authentication and charging are performed by simply inserting a plug between the EV and the charging station while referring to a park-and-charging scheme, in case of a wireless power transfer, by which the authentication and charging are performed by simply parking the vehicle over a charging spot of the charging station.

The ISO 15118 standard specifies an authentication based on a public key infrastructure (PKI) as a basis for implementing the PnC method. According to the PKI system specified in the ISO 15118 standard, a contract certificate issued based on a mobility operator (MO) root certification authority (RootCA) certificate issued by an MO RootCA is installed in the EV. The supply equipment communication controller (SECC) certificate issued base on a vehicle-to-grid (V2G) RootCA certificate a V2G RootCA V2G RootCA) is installed in the charging station. During an authentication process, the EV receives an SECC certificate chain from the charging station and verifies the SECC certificate. During an authorization process, the charging station receives the contract certificate chain from the EV and verifies the contract certificate to check that the vehicle has an effective contractual relationship and perform a billing procedure.

The charging station provides the EV with services such as charging or certificate installation or update based on a contract with the MO. If only a small number of MOs and V2Gs exist in the market, the PKI-based authentication described above can be implemented without any problems and can enhance the convenience of the EV owner. However, if there are multiple MOs in the market, the charging station may not be equipped with some of the multiple MO RootCA certificates required to verify the contract certificate chain, and thus may not be able to provide the services for some EVs. Similarly, if there are multiple V2Gs in the market, the EV may not be equipped with some of the multiple V2G RootCA certificates required to verify the SECC certificate chain, and thus may not be verify some charging stations. However, the discussion of the latter issue is omitted in this specification because a role of an original equipment manufacturer (OEM), i.e., vehicle manufacturer, may be critical for this issue.

A cross-certification is a technique to solve a problem caused by an absence of a root certificate required to verify a certificate chain of a counterpart device. However, the cross-certification in the PnC charging has been discussed limitedly to a cross-certification between two V2G PKI families or between a V2G PKI family and an OEM PKI family, and there has been little discussion on a cross-certification between the V2G PKI family and a MO PKI family. The reason seems to that, unlike the OEM certificate chain which works limitedly during a contract certificate installation process, the MO certificate chain continuously works during an operation of the EV, and the MO certificate chain including the contract certificate contains information that requires security such as personal information or contract information. In addition, it is assumed that the fact that only a small number of entities in the market were expected to be in charge of the role of the MO is part of the reason. Further, the cross-certification for the MO PKI certificates may violate constraints set by the ISO 15118 standard and may require modifications of the protocol specified in the standard.

However, considering that lots of charging station operators are participating in the conductive charging market at present time, many MOs may exist in the market someday when the PnC charging systems are actively deployed. Therefore, it is necessary to refine the standards and systems to minimize the situation in which each charging station cannot provide the services to some EVs due to the absence of the contracts with some of the multiple MOs.

SUMMARY

To solve the problems above, an authentication method and device for enabling a charging station are configured to verify a contract certificate of an electric vehicle based on a cross certificate in a situation where there are multiple MOs in the market and the charging station is not equipped with an MO RootCA certificate.

According to an aspect of an exemplary embodiment, an electric vehicle authentication method for providing plug-and-charge (PnC) charging to an electric vehicle in a charging station includes: transmitting, to the electric vehicle, a supply equipment communication controller (SECC) certificate chain including an SECC certificate and at least one charging device family subordinate certification authority (SubCA) certificate having been used to issue the SECC certificate and receiving a verification result for the SECC certificate from the electric vehicle; receiving a contract certificate chain including a contract certificate from the electric vehicle; and, when a cross certificate is included in the contract certificate chain, verifying the cross certificate based on a predetermined root certification authority (RootCA) Certificate to obtain a public key of a charging operator RootCA or a charging operator SubCA included in the cross certificate and verifying the contract certificate based on an obtained public key.

The predetermined RootCA certificate used to verify the cross certificate may include a public key of a vehicle-to-grid (V2G) CA which has been a basis for issuing the SECC certificate.

The predetermined RootCA certificate used to verify the cross certificate may be a certificate of a bridge CA that issues the cross certificate on behalf of a plurality of V2G Root CAs.

The operation of verifying the contract certificate may include, when the cross certificate is not included in the contract certificate chain, verifying the cross certificate based on a charging operator RootCA certificate stored in the charging station.

The operation of verifying the contract certificate may include, when the cross certificate is not included in the contract certificate chain, making the cross certificate to be installed in the electric vehicle.

The electric vehicle authentication method may further include: requesting an authorization from a settlement server by transmitting predetermined subject identification information in the contract certificate to the settlement server; and receiving an authorization result from the settlement server and enabling a charging according to the authorization result.

According to another aspect of an exemplary embodiment, a charging station device configured to provide plug-and-charge (PnC) charging to an electric vehicle (EV) includes: a memory storing program instructions; and a processor coupled to the memory and executing the program instructions stored in the memory. The program instructions, when executed by the processor, causes the processor to: transmit, to the electric vehicle, a supply equipment communication controller (SECC) certificate chain including an SECC certificate and at least one charging device family subordinate certification authority (SubCA) Certificate having been used to issue the SECC certificate and receive a verification result for the SECC certificate from the electric vehicle; receive a contract certificate chain including a contract certificate from the electric vehicle; and, when a cross certificate is included in the contract certificate chain, verify the cross certificate based on a predetermined vehicle-to-grid (V2G) root certification authority (RootCA) Certificate to obtain a public key of a charging operator RootCA or a charging operator SubCA included in the cross certificate and verify the contract certificate based on an obtained public key.

According to an exemplary embodiment of the present disclosure, the charging station can verify the certificate chain of the MO PKI family without the MO RootCA certificate during an authorization process for the PnC charging. Accordingly, the PnC charging may be enabled through a simple authentication procedure even when there are a plurality of charging point operators or the MOs. Also, the charging stations need not maintain all MO RootCA certificates and the EVs need not maintain all V2G RootCA certificates.

Therefore, the present disclosure may minimize a memory burden of the charging station and the EV, enable to verify a validity and integrity of the certificate through a simple procedure without any risk of unnecessary leakage or duplication of the certificates, and facilitate the authentication and authorization for the PnC charging.

BRIEF DESCRIPTION OF THE DRAWINGS

In order that the disclosure may be well understood, there will now be described various forms thereof, given by way of example, reference being made to the accompanying drawings, in which.

Figure 1:
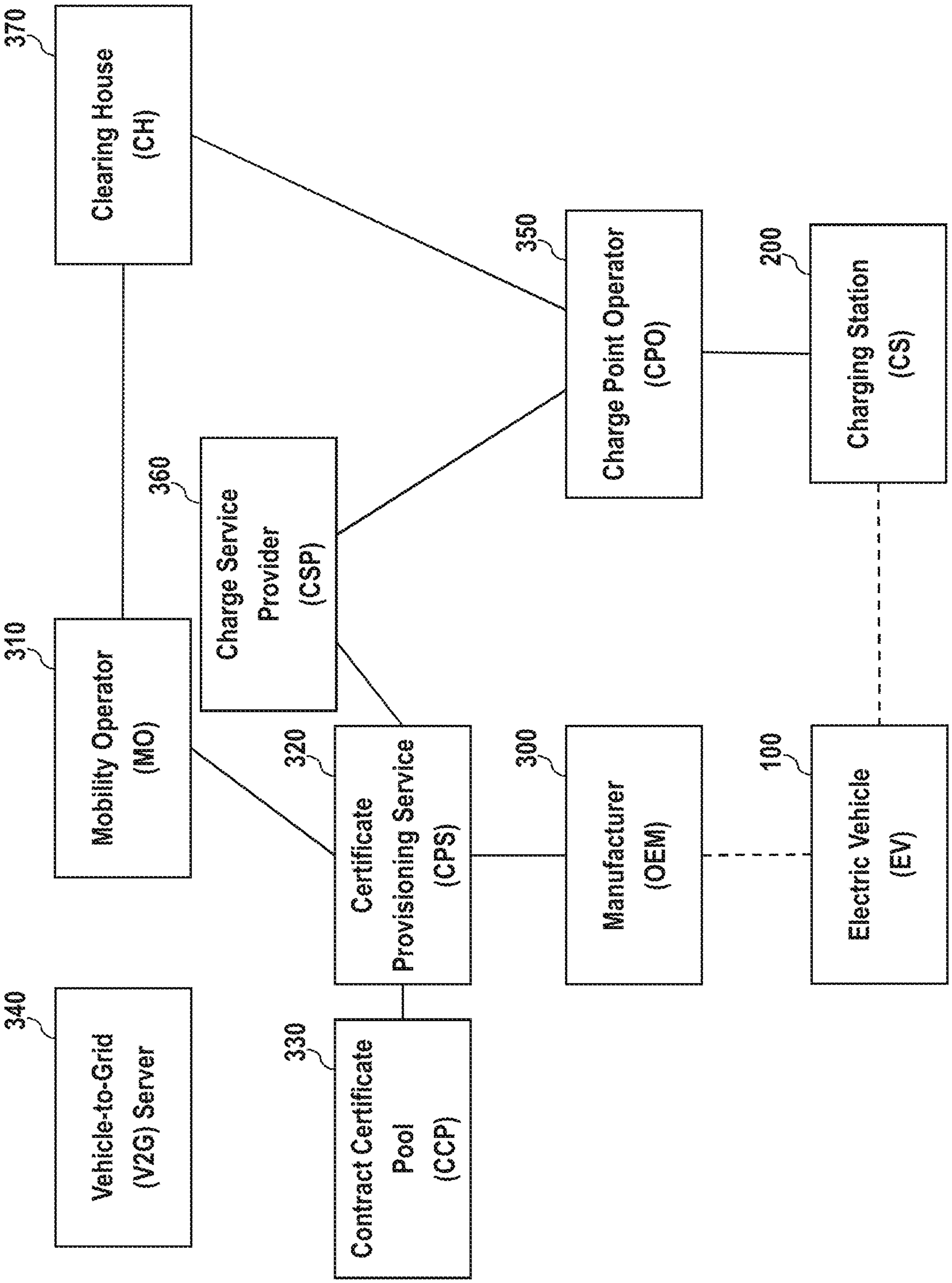
FIG. 1 is a block diagram of an electric vehicle charging infrastructure according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as “first” and “second” designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure.

The expression "and/or" may be used to refer to a combination of a plurality of listed items or any of the plurality of listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads. The EV may include an electric vehicle, an electric automobile, an electric road vehicle (ERV), a plug-in vehicle (PV), an electromotive vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An electric vehicle that recharges the on-vehicle primary battery by connecting to the power grid.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility and the power grid and the EV through a contactless channel.

"Utility": A set of systems which supply electrical energy and include a customer information system (CIS), an advanced metering infrastructure (AMI), rates and revenue system, etc. The utility may provide an EV with energy according to a rates table and through discrete events. Also, the utility may provide information related to certification on EVs, interval of power consumption measurements, and tariff.

"Smart charging": A system in which an electric vehicle supply equipment (EVSE) and/or a PEV communicate with the power grid to optimize a charging ratio or a discharging ratio of an EV by taking into account the capacity allowed by the power grid or the tariff for the electricity.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": A magnetic coupling between two coils. One of the two coils may be referred to as the ground assembly (GA) coil, and the other one of the two coils may be referred to as the vehicle assembly (VA) coil.

"Original Equipment Manufacturer (OEM)": A server operated by a producer who manufactures the EV and may refer to a Root Certification Authority (RootCA) issuing an OEM RootCA certificate.

"Mobility Operator (MO)": A service provider with which the EV owner has a contract for services related to the EV operation such as a charging, authorization, and billing to enable an EV driver may charge the EV in the charging station.

"Charging station (CS)": A facility equipped with one or more electric vehicle supply equipment's (EVSEs) and physically performing the charging to the EVs.

"Charge point operator (CPO)": An entity managing electricity to provide a requested energy transfer service.

"Charging station operator (CSO)": An entity managing electricity to provide a requested energy transfer service. The charging station operator may be a term having a same meaning as a charge point operator (CPO).

"Charge Service Provider (CSP)": An entity managing and authenticating EV user's credentials and providing the billing and other value-added services to customers. The CSP may be considered as a special type of the mobility operator (MO) and may be integrated with the MO.

"Clearing House (CH)": An entity handling cooperation between the MOs, CSPs, and CSOs. In particular, the clearing house may perform a role of an intermediate actor facilitating authorization, billing, and settling procedure for the EV charging service roaming, between two clearing parties.

"Roaming": Information changes and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

"Vehicle-to-Grid charging loop" or "V2G charging loop": A message transmission and reception process for controlling a charging process according to ISO 15118 standard.'

"e-Mobility Account Identifier (eMAID)": A unique identifier of an EV that links a contract certificate for the EV to a payment account of the EV owner.

"V2G Transfer Protocol (V2GTP)": A communication protocol for transmitting V2G messages between two V2GTP entities.

Exemplary embodiments of the present disclosure will now be described in detail with reference to the accompanying drawings.

Figure 2:
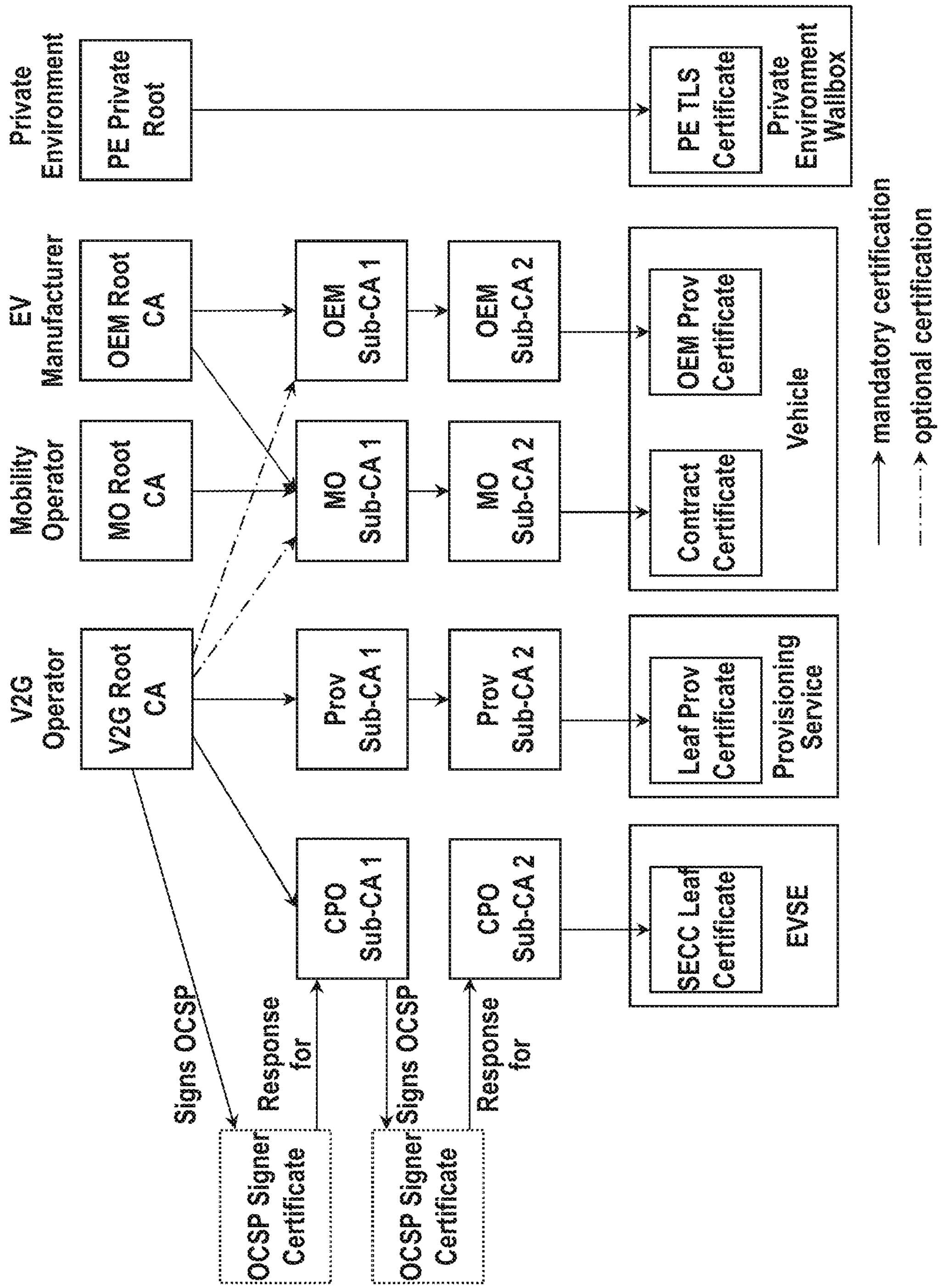
FIG. 2 shows an example of a certificate hierarchy applicable to an exemplary embodiment of the present disclosure.

FIG. 1 is a block diagram of an electric vehicle (EV) charging infrastructure according to an exemplary embodiment of the present disclosure and shows entities related to the EV charging. FIG. 2 shows a certificate hierarchy applicable to an exemplary embodiment of the present disclosure.

The EV charging infrastructure of FIG. 1, which may support a charging service to the EV 100, includes a charging station (CS) 200, an original equipment manufacturer (OEM) server 300, a mobility operator (MO) 310, and a certificate provisioning service (CPS) 320, a contract certificate pool (CCP) 330, a vehicle-to-grid (V2G) server 340, a charge point operator (CPO) 350, a charge service provider (CSP) 360, and a clearing house (CH) 370.

The EV charging infrastructure may enable to implement a Vehicle-to-Grid Integration (VGI) system which allows not only to charge a battery of the EV 100 with electrical energy supplied from the power grid, but also to supply the electrical energy stored in the battery of the EV 100 to the power grid or a specific building or a device electrically connected to the power grid. An EV user may charge the EV 100 at the charging station 200 using a PnC method. In the charging process, the EV 100 and the charging station 200 act as primary actors while the OEM server 300, the MO 310, the CPS 320, the CCP 330, and the V2G server 340, the CPO 350, the CSP 360, and the CH 370 may act as secondary actors.

The EV 100 refers to a general electric vehicle including a plug-in hybrid electric vehicle (PHEV) and can be charged by a conductive charging or a wireless power transfer at the charging station 200. The charging station (CS) 200 actually performs charging for the EV 100. The charging station 200 may be equipped with one or more EV supply equipment (EVSE), and each EVSE may include at least one conductive charger and/or wireless charging spot that actually transmits power. The charging stations 200 may be a dedicated commercial charging area. Also, the charging station 200 may be located at various places such as a parking lot of the EV owner's house, a parking lot allocated for the EV charging at a gas station, and a parking area of a shopping center or an office building, for example. The charging station 200 may also be referred to as a 'charging point', 'EV charging station', 'electric charging point', or 'electronic charging station (ECS)'.

The original equipment manufacturer (OEM) 300 may refer to an electric vehicle manufacturer or an OEM server for authenticating an electric vehicle and providing various information. In particular, with respect to the certificates, the OEM may refer to an OEM Root Certification Authority that issues an OEM RootCA certificate.

The mobility operator (MO) 310 is a service provider having a contractual engagement with the EV owner for services related to the EV operation such as the charging, authorization, and billing to enable the EV driver may charge the EV in the charging station 200. In order for the EV 100 to receive the charging service from a current charging station 200, it is required that the charging station 200 belongs to the MO 310 or support a roaming scenario. The MO 310 may be operated by an electricity supplier or an electricity wholesaler, for example. The MO 310 may also be referred to as an 'E-mobility service provider (EMSP)'. The MO 310 also acts as a RootCA that issues an MO RootCA certificate.

The certificate provisioning service (CPS) 320 provides a client such as the EV with a contract certificate chain and encryption keys used for transmitting or receiving the certificates during a process of installing or updating the contract certificate in the EV. The CPS 320 is equipped with a leaf provisioning certificate and provisioning intermediary certification authority (SubCA) certificates such as provisioning SubCA 1 certificate and provisioning SubCA 2 certificate. When the contract certificate is installed or updated in the EV 100, the CPS 130 provides the EV with a provisioning service of providing a public key of each MO, a Diffie-Hellman (DH) public key, and eMAID along with the contract certificate chain, so that the EV validate the contract certificate chain and verify the integrity and authenticity of the contract certificate using such data.

The contract certificate pool (CCP) 330 temporarily stores a response message for the installation or update during the process of installing or updating the contract certificate in the EV. Taking into account that a time limit set for the installation or update in the ISO 15118 standard is very short and strict, the response message is stored in the CCP 330 in advance and maintained until the installation or update is completed. Since there may be a plurality of EVs for which the installation or update of the contract certificate is performed, the response message is maintained in a form of a directory after an index is assigned to each message.

The Vehicle-to-grid (V2G) server 150, hereinbelow referred to as 'V2G') authenticates the identity of each participant in the VGI system and manages all settings and system configuration related to a forward power transfer from the grid to each EV 100 and reverse power transfer from each EV 100 to the grid. In addition, considering that the power demand and a power factor may fluctuate by time within the grid, the V2G 340 performs an operation for a demand response (DR), i.e., an operation for peak reduction and may perform a frequency regulation (FR) operation to prevent a serious distortion of the power factor. In a viewpoint of the DR and FR, the V2G 340 may adjust the instantaneous electrical energy supply from various power generation companies, renewable energy sources, and EVs 100 moment by moment and may monitor the power supply to each consumer. The V2G 340 acts as a highest RootCA in the public key infrastructure (PKI) for the EV charging infrastructure. Thus, the V2G 340 serves as a highest trust anchor, and all actors shown in FIG. 1 consider the V2G RootCA as a trustworthy actor.

The charge point operator (CPO) 350 is in charge of an operation of the charging station and manages electricity to provide a requested energy transfer service. The CPO 350 may be operated by a charging station manufacturer or an electricity provider, for example. Regarding the PKI, the CPO 350 may operate CPO SubCAs such as CPO SubCA 1 and CPO SubCA 2 required to issue an SECC leaf certificate for each charging station.

The charge service provider (CSP) 360 manages and authenticates credentials of the EV user and provides billing and other value-added services to customers. The CSP 360 may be considered as a special type of the MO 310 and may be implemented to be integrated with the MO 310. There may exist a plurality of CSPs 360. In such a case, each CSP 360 may be associated with one or more CPOs 350 so that the CSP 360 and the one or more CPOs 350 constitute a charging network. The EV 100 can receive the charging service by the plug-and-charge or park-and-charge (PnC) method in the CPO 350 associated with the CSP 360 that is associated again with the MO 310 having the contractual relationship with the EV 110. However, a roaming is required when the EV 100 is to be charged from another CPO 350 which is not associated with the CSP 360 that is associated again with the MO 100 having the contractual relationship with the EV 100. Each CSP 360 may exchange information with another CSP or CPO 350 belonging to another charging network and may also exchange information with the clearing house 370 to enable the roaming.

The clearing house (CH) 370 handles the cooperation issues between the MOs 300 and the CSPs 360. That is, the clearing house 370 may perform a role of an intermediate actor facilitating the authorization, billing, and settling procedure for the EV charging service roaming between two clearing parties. When the EV owner wishes to charge the EV at a charging station that does not belong to the charging network of the MO 310 having the contractual relationship with the EV, the CH 370 may be connected to the CPO 350 or the CSP 360 to facilitate the roaming. In a situation that the roaming is necessary, the CH 370 enables the CPO 350 or CSP 360 to conclude a contract with the MO 310 and transfer authorization data and charging detail records (CDR) to the MO 310. The CH 370 may also be referred to as a 'contract clearing house (CCH)', 'mobility clearing house (MCH)', 'roaming platform', or 'e-mobility clearing house (E-MOCH)'.

Though the electric vehicle manufacturer (OEM) 300, the mobility operator (MO) 310, the certificate provisioning service (CPS) 320, the contract certificate pool (CCP) 330, the vehicle-to-grid (V2G) 340, the charge point operator (CPO) 350, the charging service provider (CSP) 360, and the contract clearing house (CH) 370 may seem to refer to persons or organizations, these terms used herein including the claims are named just functionally in short to increase a readability and may be implemented in hardware, software, and/or a combination thereof. In an exemplary embodiment, each of these components may be a server device implemented by a combination of hardware and software and may allow an access of other devices through a network such as Internet. Since these components are functionally divided, two or more of them may be stored and executed in a single physical device or may be integrated into a single program. In particular, a single entity may perform the roles of both the CSO and the CSP, and another single entity may serve as both the CPS and the CCP. Meanwhile, one or more of the components may be rearranged to result in a different system configuration and to have different names.

On the other hand, the EV charging service and the related infrastructure are in a field where various industrial fields such as automobiles, power grid, energy, transportation, communications, finance, and electronic products converges, and standardizations have been carried out in parallel in various viewpoints and by various subjects including multiple international standardization organizations and domestic standardization organizations in individual countries, and thus there exist many terms containing similar concepts. In particular, the charging station operator (CSO) and the charge point operator (CPO) may be referred to as a charging station operator (CSO). In addition, the charging service provider (CSP) has at least partially in common with the mobility operator (MO) in terms of their roles and functions and may be used interchangeably. Such circumstances is to be taken into account while interpreting the present specification including the claims.

In the EV charging infrastructure shown in FIG. 1, a public key infrastructure (PKI) is used as a basis for operating the PnC. The PKI provides a framework for verifying identities of a person and a device, activating confidential communications, and ensuring controlled access to resources. FIG. 2 shows an example of a PKI-based certificate hierarchy applicable to an exemplary embodiment of the present disclosure.

Referring to FIG. 2, the OEM 300 serves as an OEM RootCA that issues the OEM RootCA certificate, and also operates subordinate certification authorities, i.e., an OEM SubCA 1 and an OEM SubCA 2. The OEM RootCA self-signs information such as its own public key and its own identification information with its own private key to issue the OEM RootCA certificate containing a signature value and signed information. In addition, the OEM RootCA issues an OEM SubCA 1 Certificate by signing information such as a public key and identification information of the OEM SubCA 1 with its private key. The OEM SubCA 1 issues an OEM SubCA 2 Certificate by signing information such as a public key and identification information of the OEM SubCA 2 with a private key of the OEM SubCA 1. When the EV is being manufactured, the OEM SubCA 2 issues an OEM provisioning certificate by signing information such as a public key and identification information of the EV 100 with a private key of the OEM SubCA 2. The OEM provisioning certificate can be used to verify a signature in the certificate installation request message during a certificate installation process for the EV 100, and enables to uniquely identify the vehicle during a life of the EV 100.

The MO 310 may also serve as a MO RootCA that issues an MO RootCA certificate. The MO RootCA self-signs information such as its own public key and its own identification information with its own private key to issue the MO RootCA certificate containing a signature value and signed information. In addition, the MO RootCA issues an MO SubCA 1 certificate by signing information such as a public key and identification information of the MO SubCA 1 with its private key. The MO SubCA 1 issues an MO SubCA 2 certificate by signing information such as a public key and identification information of the MO SubCA 2 with a private key of the MO SubCA 1. When the EV is delivered to the EV owner, the MO SubCA 2 may issue the contract certificate based on a contract concluded between the MO 310 and the EV owner by signing information such as a public key and identification information of the EV 100 with a private key of the MO SubCA 2, so that the contract certificate may be installed in the EV 100 through a charging station (CS) 200 that the EV first visits. The contract certificate may be linked to the EV owner's payment account via a unique identifier called an e-Mobility Account Identifier (eMAID).

The OEM provisioning certificate and the contract certificate may be issued based on the OEM RootCA certificate and the MO RootCA certificate, respectively, and may be independent from the global RootCA certificate, i.e., the V2G RootCA certificate. As indicated by dashed lines in FIG. 2, however, the OEM provisioning certificate and the contract certificate may be issued based on the V2G RootCA certificate instead of the OEM RootCA certificate and the MO RootCA certificate.

The V2G 340 may enable to issue at least two certificate chains, i.e., a certificate chain for the CPO 350 and the CS 200 and another certificate chain for the provisioning service.

First, the V2G RootCA self-signs information such as its own public key and its own identification information with its own private key to issue the V2G RootCA certificate containing a signature value and signed information. In addition, the V2G RootCA issues a CPO SubCA 1 certificate by signing information such as a public key and identification information of the CPO SubCA 1 with its private key. The CPO SubCA 1 issues a CPO SubCA 2 Certificate by signing information such as a public key and identification information of the CPO SubCA 2 with a private key of the CPO SubCA 1. The CPO SubCA 2 may issue an SECC leaf certificate by signing information such as a public key and identification information of a supply equipment communication controller (SECC) of an electric vehicle supply equipment (EVSE) in the CS 200 with a private key of the CPO SubCA 2, so that the SECC leaf certificate is installed in the CS 200. The SECC leaf certificate may be used by the EV 10 during the establishment of the TLS communications between the EV 100 and the CS 200. This certificate may be stored in the CS 200 as well as in a backend of the CSO 350.

In addition, the V2G RootCA issues a provisioning SubCA 1 certificate by signing information such as a public key and identification information of the provisioning SubCA 1 with its private key. The provisioning SubCA 1 issues a provisioning SubCA 2 certificate by signing information such as a public key and identification information of the provisioning SubCA 2 with a private key of the provisioning SubCA 1. The provisioning SubCA 2 may issue a leaf provisioning certificate by signing information such as a public key and identification information of the CPS 320 with a private key of the provisioning SubCA 2 and provide the leaf provisioning certificate to the CPS 320 so as to be installed in the CPS 320.

Meanwhile, each of the RootCAs, i.e., the V2G RootCA, the MO RootCA, and the OEM RootCA, may issue and provide an Online Certificate Status Protocol (OCSP) certificate, so that clients may access an OCSP server according to an Online Certificate Status Protocol to query a certificate status regarding a revocation of the certificate indicating a validity of the certificate and receive a query result. Although it is shown in the drawing as if the OCSP certificate is available only for the CPO SubCAs (i.e., CPO SubCA 1 and CPO SubCA 2) for simplicity, all the RootCAs may issue an OCSP certificate to allow the query of the validity of the certificates in the certificate chains associated with their RootCA certificates.

In exemplary embodiments of the present disclosure, the certificate may be verified or validated by one of three generally available methods. First, a certificate recipient may validate an integrity of the certificate by verifying the signature value in the certificate using a public key of the signer. Second, the certificate recipient may validate the integrity and reliability of each certificate in the certificate chain by comparing owner information of each certificate with issuer information of its SubCA certificate sequentially from the RootCA certificate to the leaf certificate in the certificate chain. Third, the certificate recipient may validate the certificate by checking whether the certificate has been revoked or not through a Certificate Revocation List (CRL) received from the RootCA or by querying the certificate status from the OCSP server associated with the RootCA.

Figure 3:
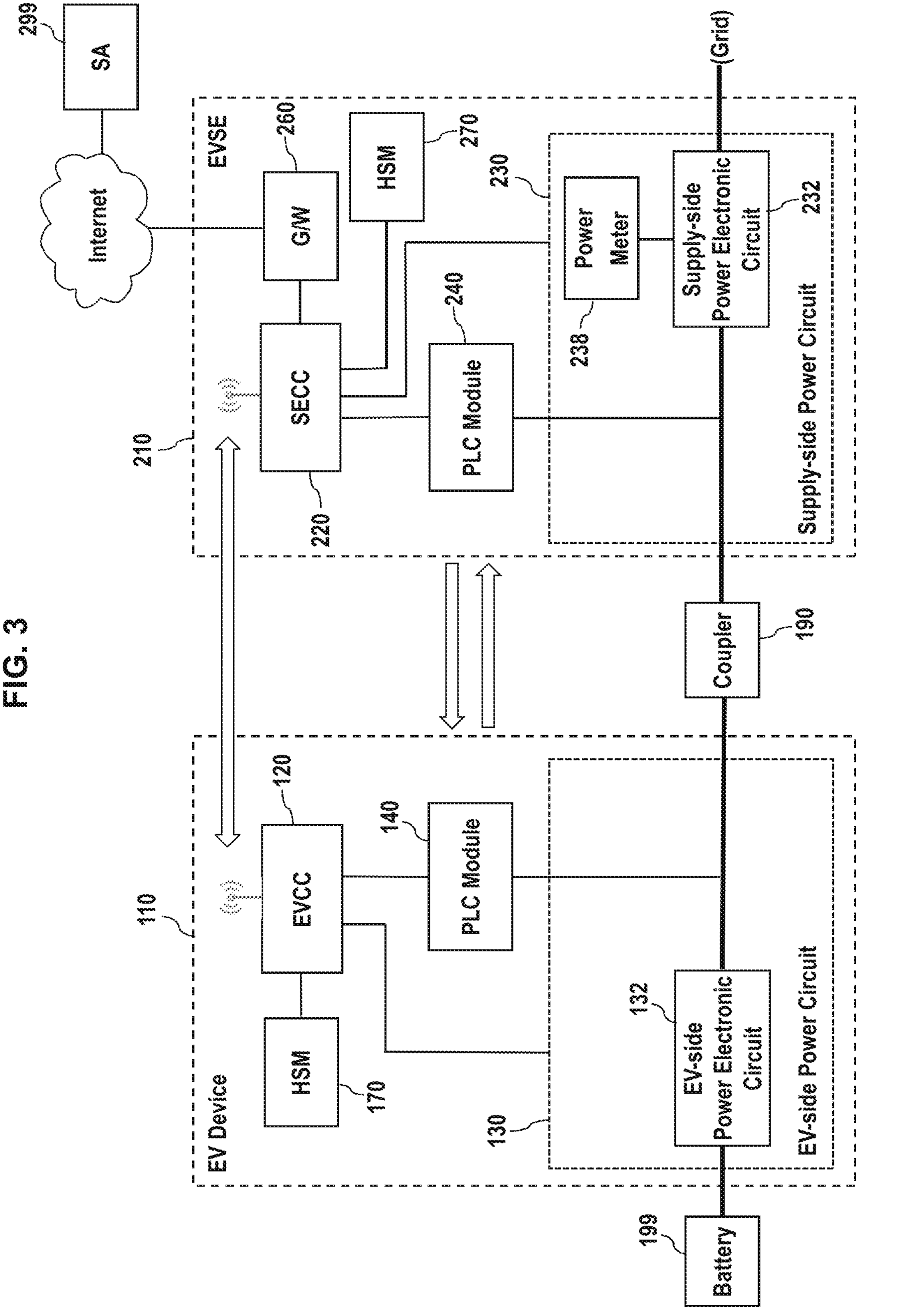
FIG. 3 is a block diagram of an embodiment of an electric vehicle and a charging station shown in FIG. 1.

FIG. 3 is a block diagram of an embodiment of the EV and the charging station shown in FIG. 1. The illustrated EV and EVSE are suitable for a conductive power transfer system. The charging station 200 includes at least one EV supply equipment (EVSE) 210, and the EV 100 includes an EV device 110 provided correspondingly to the EVSE 210 for power transfer. The EVSE 210 may supply DC or AC power to the EV 100 through a conductor so that a battery 199 mounted in the EV 100 may be charged. The EV device 110 and the EVSE 210 may be connected through a coupler 190.

The EVSE 210 may include a supply equipment communication controller (SECC) 220, a supply-side power circuit 230, a power line communications (PLC) module 240, a hardware security module (HSM) 270, and a gateway 280. Though the SECC 220 may be installed outside the EVSE 210 as well in the charging station and one SECC 220 may be configured to control a plurality of, for example, four EVSEs 210, it is shown in FIG. 3 that one EVSE 210 includes two SECCs 220 for the convenience of description.

The SECC 220, which is a high-level controller, may communicate with an EV communication controller (EVCC) 120 in the EV device 110 through power line communications (PLC) or a wireless LAN (WLAN). The SECC 220 and the EVCC 120 may communicate with each other in an application layer, i.e., in an OSI layer 3 and higher layers according to an ISO 15118-2 or an ISO 15118-20 standard, for example. A physical layer and a data link layer between the SECC 220 and the EVCC 120 may be configured to conform to the ISO 15118-8 standard, for example. In addition, the SECC 220 may control the supply-side power circuit 230. Further, the SECC 220 may perform an authentication of the EV user and a payment process for a charging tariff through secondary actors (SAs) such as the MO 310 through the Internet.

The supply-side power circuit 230 may supply the power from the power grid to the EV 100 or supply the power discharged by the EV 100 to the power grid. The supply-side power circuit 230 may include a supply-side power electronic circuit 232, and an electric power meter 238. The supply-side power electronic circuit 232 may include one or more of a converter adjusting a level of a voltage and/or a current and a rectifier converting an AC current into a DC current. The electric power meter 238 measures an amount of energy supplied to the EV device 110 through the supply-side power electronic circuit 232 or an amount of energy supplied in a reverse direction from the EV device 110 to the supply-side power electronic circuit 232.

The PLC module 240 may modulate a signal transmitted to the EV device 110 through the power line communications and demodulate a signal received from the EV device 110 through the power line communications. Although not shown in the drawing, the EVSE 210 may further include a control pilot transceiver capable of transmitting a control signal to the EV device 110 through a cable connecting the EVSE 210 and the EV device 110 and receiving a control signal from the EV device 110.

The hardware security module (HSM) 270 may store various security information such as the SECC certificate, a public key and a private key of the SECC 220, a secret key for a symmetric key encryption, and other credentials of the SECC 220, and an OEM RootCA certificate, and/or a V2G RootCA certificate for verifying the EV Certificate chain received from the EVCC 120.

The gateway 280 may provide a connection of the SECC 220 to a secondary actor (SA) 299 over the Internet so as to enable the authentication of the user and the payment processing through communications between the SECC 220 and the SA 299.

The EV device 110 may include an EVCC 120, an EV-side power circuit 130, a PLC module 140, and a hardware security module (HSM) 170. The EVCC 120, which is a high-level controller, may communicate with the SECC 220 in the EVSE 210 through the power line communications (PLC) or the wireless LAN (WLAN) and control the EV-side power circuit 130. The EV-side power circuit 130 may charge the battery 199 used for a propulsion of the EV 100 by the power received from the EVSE 210, or may supply the energy stored in the battery 199 to the power grid through the EVSE 210. The EV-side power electronic circuit 132 in the EV-side power circuit 130 may include one or more of a converter adjusting a level of a voltage and/or a current and a rectifier converting the AC current into the DC current. The PLC module 140 may modulate a signal transmitted to the EVSE 210 through the power line communications and demodulate a signal received from the EVSE 210 through the power line communications. The hardware security module (HSM) 170 may store various security information such as the contract certificate, a public key and a private key of the EVCC 120, the secret key for the symmetric key encryption, and other credentials of the EVCC 120, and the V2G RootCA certificate for verifying the SECC certificate chain received from the SECC 220.

Figure 4:
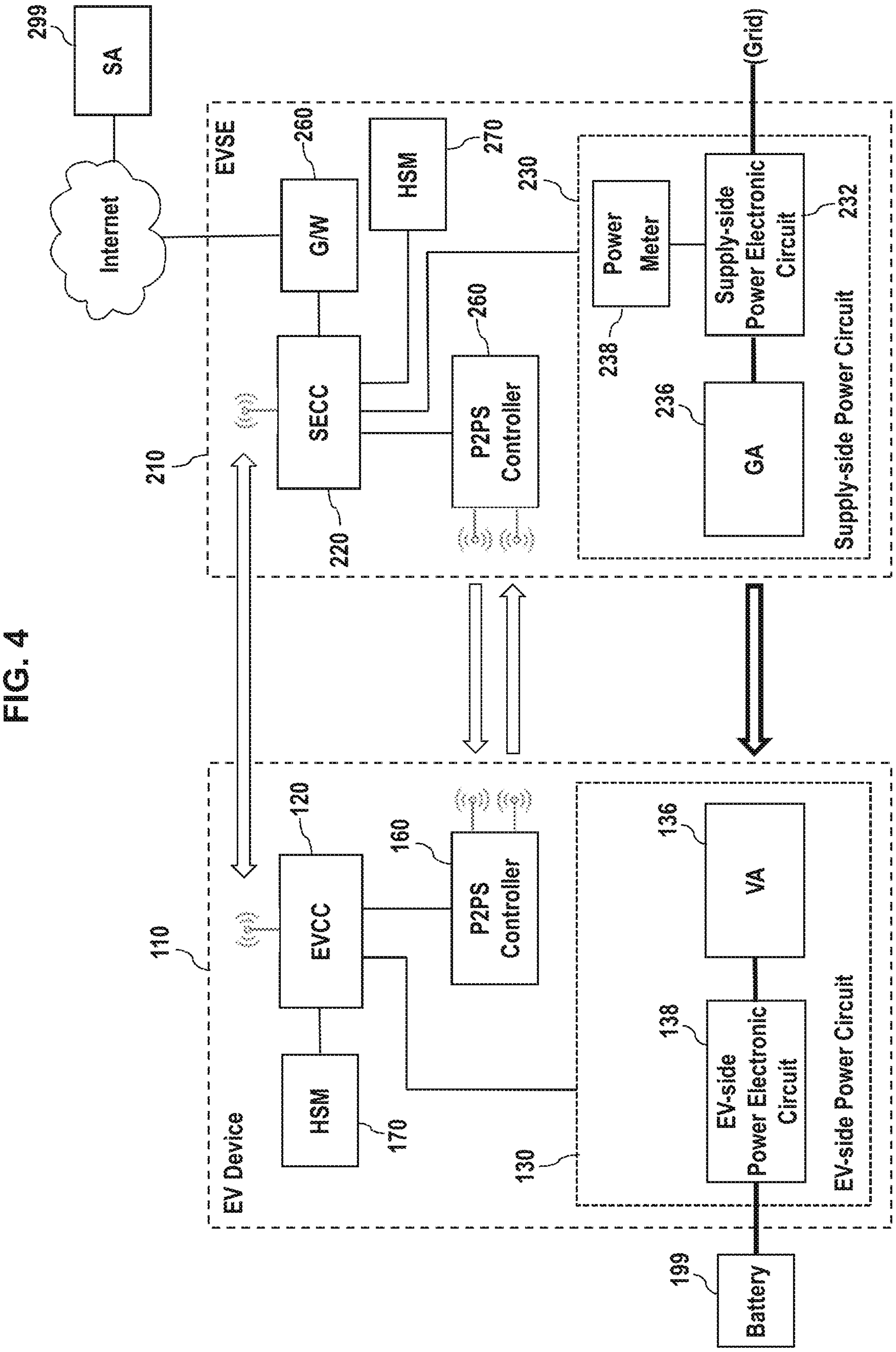
FIG. 4 is a block diagram of another embodiment of the electric vehicle and the charging station shown in FIG. 1.

FIG. 4 is a block diagram of another embodiment of the EV and the charging station shown in FIG. 1. The illustrated EV and EVSE are suitable for a wireless power transfer system. The charging station 200 includes at least one EV supply equipment (EVSE) 210, and the EV 100 includes an EV device 110 provided correspondingly to the EVSE 210 for power transfer. The EVSE 210 may supply energy to the EV 100 by a wireless power transfer so that the battery 199 mounted in the EV 100 may be charged.

The EVSE 210 may include an SECC 220, a supply-side power circuit 230, a point-to-point signal (P2PS) controller 260, a hardware security module 270, and a gateway 280. Though the SECC 220 may be installed outside the EVSE 210 as well in the charging station and one SECC 220 may be configured to control a plurality of, for example, four EVSEs 210, it is shown in FIG. 2 that one EVSE 210 includes two SECCs 220 for the convenience of description.

The SECC 220, which is a high-level controller, may communicate with the EVCC 120 in the EV device 110 through the wireless LAN (WLAN). The SECC 220 and the EVCC 120 may communicate with each other in an application layer, i.e., in an OSI layer 3 and higher layers according to the ISO 15118-2 or ISO 15118-20 standard, for example. A physical layer and a data link layer of the WLAN link may be configured to conform to the ISO 15118-8 standard, for example. In addition, the SECC 220 may control the supply-side power circuit 230 and the P2PS controller 260. Further, the SECC 220 may perform the authentication of the EV user and the payment process for the charging tariff through the secondary actors (SAs) such as the MO 310 through the Internet.

The supply-side power circuit 230 may supply the power from the power grid to the EV 100 or supply the power discharged by the EV 100 to the power grid. During a forward power transfer process in which the power is supplied from the EVSE 210 to the EV 100, the supply-side power circuit 230 may receive the electric power supplied from the power grid, forms a magnetic flux, and transfer the energy to the EV device 110 by a magnetic resonance. The supply-side power circuit 230 may include a supply-side power electronic circuit 232 adjusting a frequency and levels of the voltage and/or the current, a ground assembly (GA) device 236 generating a high-frequency magnetic flux, and an electric power meter 238 measuring an amount of energy transferred between the EVSE 210 and the EV device 110.

The P2PS controller 260 may perform P2PS communications with a corresponding component of the EV device 110 under a control of the SECC 220. In this specification including the appended claims, the P2PS communication refers to a communication of transmitting and receiving a signal for the charging using a low frequency (LF) magnetic field signal and/or a low power excitation (LPE) signal.

The EV device 110 may include an EVCC 120, an EV-side power circuit 130, and a hardware security module 170. The EVCC 120, which is a high-level controller, may communicate with the SECC 220 in the EVSE 210 through the wireless LAN. The EVCC 120 may control the EV-side power circuit 130 and the P2PS controller 160. The P2PS controller 160 may perform P2PS communications with the P2PS controller 260 of the EVSE 210 using the low frequency (LF) magnetic field signal and/or the low power excitation (LPE) signal under the control of the EVCC 120. The EV-side power circuit 130 may transform magnetic energy received from the EVSE 210 into electrical energy to charge the battery 199, or may transform the energy stored in the battery 199 into the electrical energy to transfer the energy to the EVSE 210 in a form of the magnetic energy. During the forward power transfer process in which the power is supplied from the EVSE 210 to the EV 100, the EV-side power circuit 130 may receive the magnetic energy from the GA 236 of the EVSE 210, convert the received magnetic energy into an induced current, and rectify the induced current into a direct current to charge the battery 199. The EV-side power circuit 130 may include a vehicle assembly (VA) device 136 receiving the high-energy level magnetic energy supplied in a magnetic resonance state from the GA device 236 by capturing a magnetic flux fluctuation induced by the GA device 236 and transforming the magnetic energy into the current, and an EV-side power electronic circuit 138 rectifying the current. The hardware security module (HSM) 170 may store various security information such as the contract certificate, an EV Certificate, the public key and the private key of the EVCC 120, the secret key for the symmetric key encryption, and other credentials of the EVCC 120, and the V2G RootCA certificate for verifying the SECC certificate chain received from the SECC 220.

Figure 5:
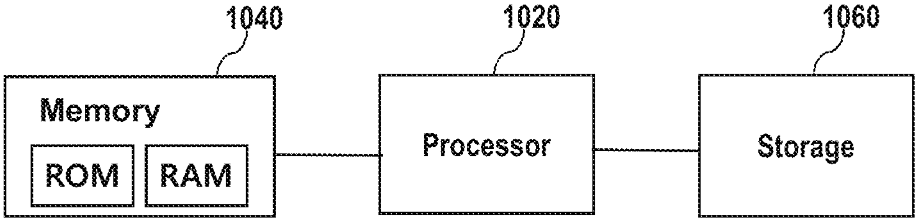
FIG. 5 is a block diagram illustrating a physical configuration of an exemplary embodiment of an SECC shown in FIG. 3 or FIG. 4.

FIG. 5 is a block diagram illustrating a physical configuration of an exemplary embodiment of the SECC 220 shown in FIG. 3 or FIG. 4. The SECC 220 may include at least one processor 1020, a memory 1040, and a storage 1060. The components of the SECC 220 may be connected by a bus to exchange data.

The processor 1020 may execute program instructions stored in the memory 1040 and/or the storage 1060. The processor 1020 may be at least one central processing unit (CPU), a graphics processing unit (GPU), or any other kind of dedicated processor suitable for performing the method according to the present disclosure. The memory 1040 may include, for example, a volatile memory such as a read only memory (ROM) and a nonvolatile memory such as a random access memory (RAM). The memory 1040 may load the program instructions stored in the storage 1060 so that the processor 1020 execute the program instructions. The storage 1060 may include an intangible recording medium suitable for storing the program instructions and data files.

Any device capable of storing data that may be readable by a computer system may be used for the storage. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

As described below, the program instructions, when executed by the processor 1020, may cause the processor 1020 to: transmit, to the electric vehicle, a supply equipment communication controller (SECC) certificate chain including an SECC certificate and at least one charging device family subordinate certification authority (SubCA) certificate having been used to issue the SECC certificate and receive a verification result for the SECC certificate from the electric vehicle; receive a contract certificate chain including a contract certificate from the electric vehicle; and, when a cross certificate is included in the contract certificate chain, verify the cross certificate based on a predetermined vehicle-to-grid (V2G) root certification authority (RootCA) Certificate to obtain a public key of a charging operator RootCA or a charging operator SubCA included in the cross certificate and verify the contract certificate based on an obtained public key.

Figure 6:
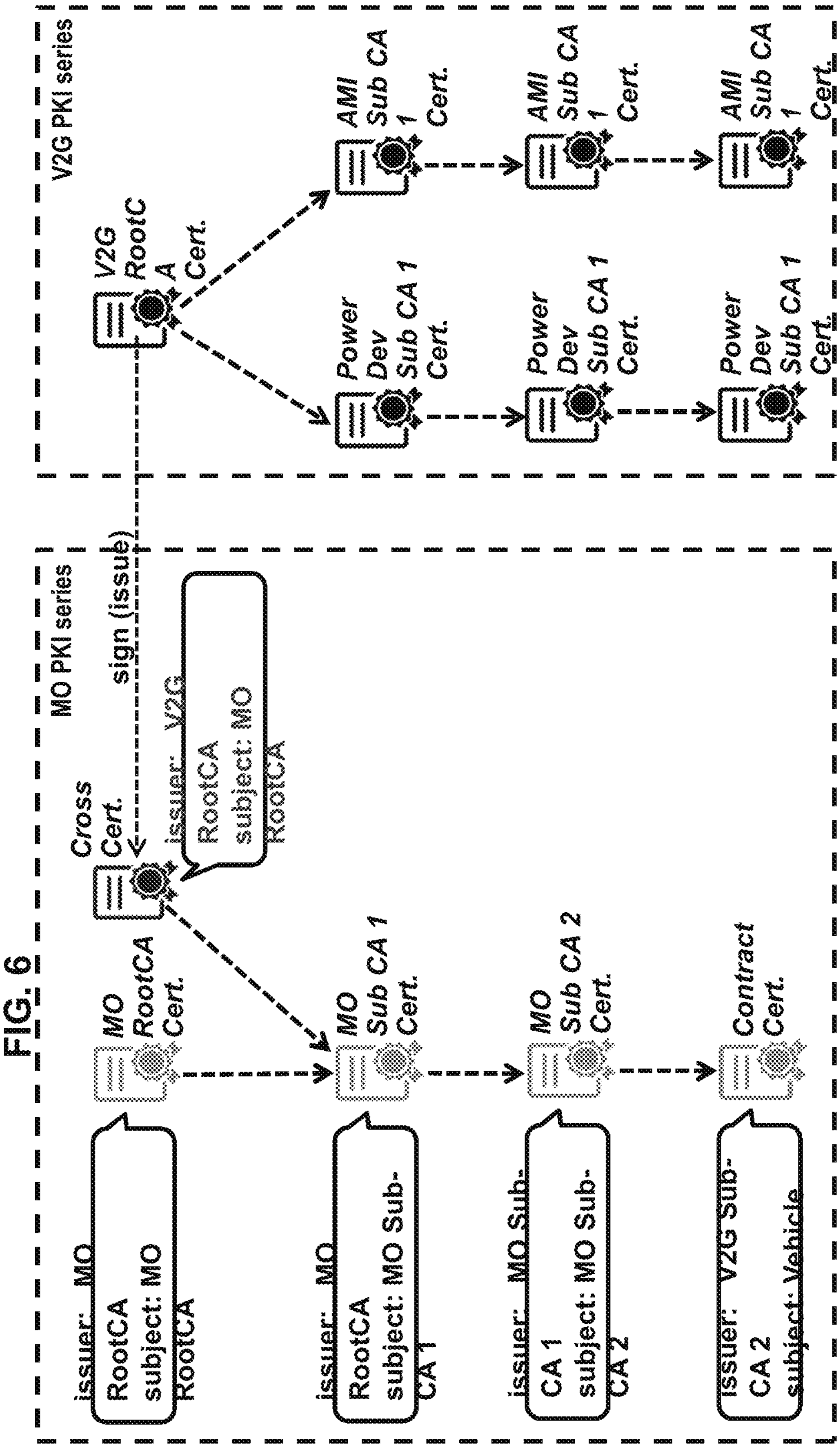
FIGS. 6-8 illustrate examples that a V2G RootCA cross-certifies a certificate in an MO PKI family.
Figure 7:
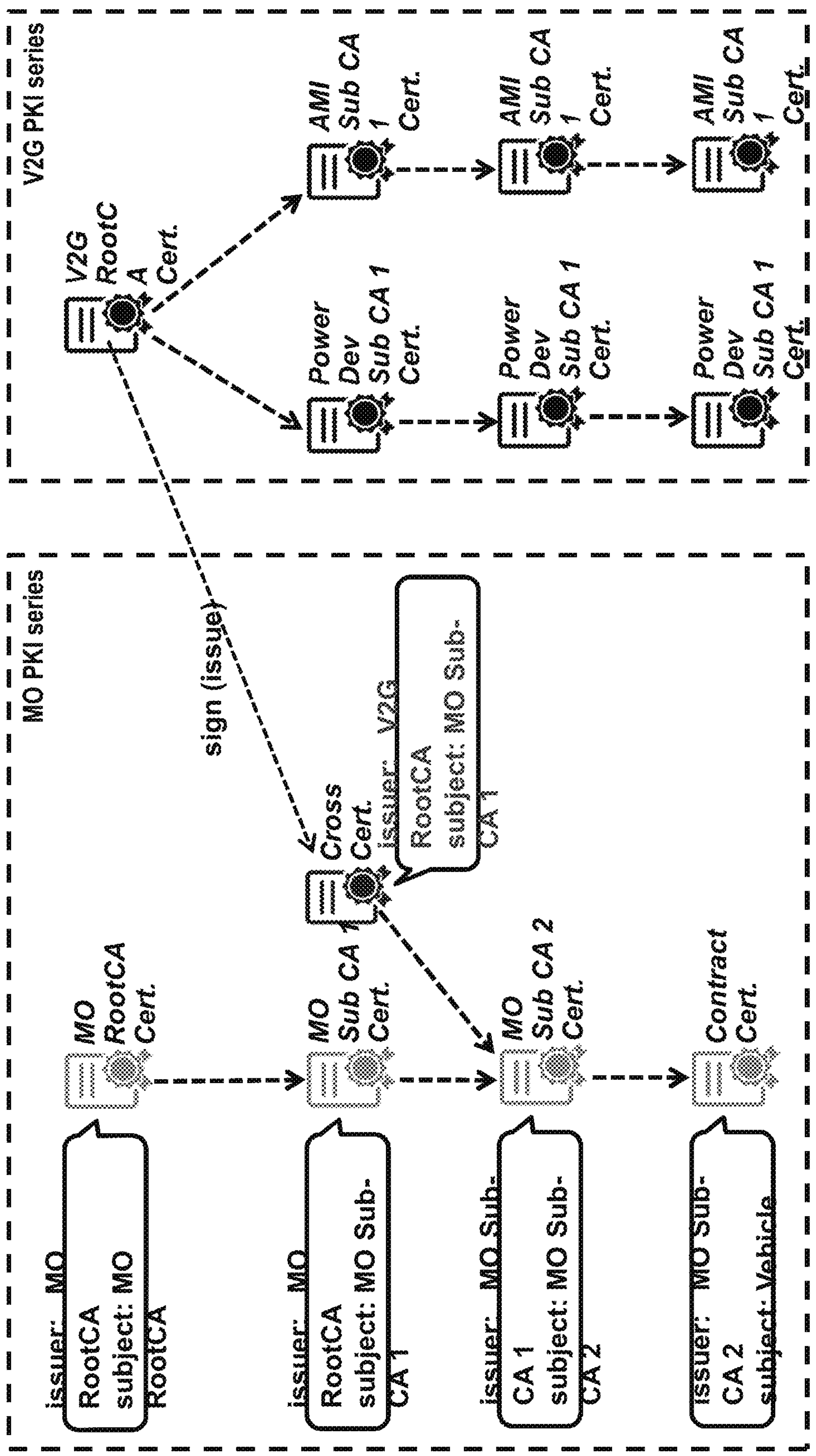
Figure 8:
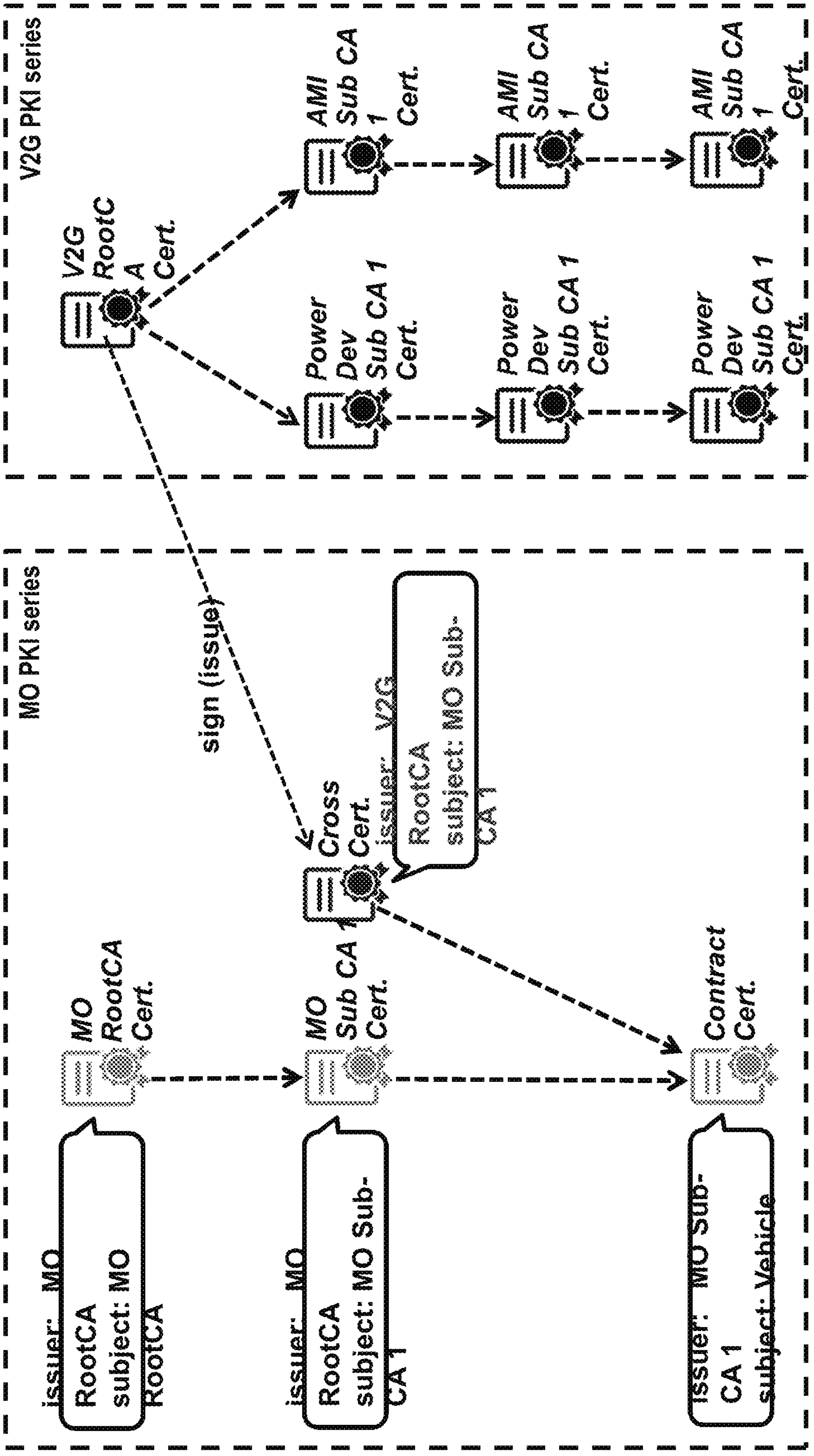

FIGS. 6-8 illustrate examples that the V2G RootCA cross-certifies a certificate in an MO PKI family. In FIG. 6 illustrates an example that the V2G RootCA cross-certifies an MO RootCA certificate in the MO PKI family. FIGS. 7 and 8 illustrates examples that the V2G RootCA cross-certifies the MO SubCA certificate (i.e., the MO SubCA 1 certificate or the MO SubCA 2 certificate) in the MO PKI family.

Originally, the MO RootCA certificate is a public key certificate of which owner or subject is the MO RootCA, of which issuer is the MO RootCA, and which includes the signature value and signed information obtained by self-signing the information such as the public key and the identification information of the MO RootCA with the private key of the MO RootCA. The MO SubCA 1 certificate is a public key certificate of which subject is the MO SubCA 1, of which issuer is the MO RootCA, and which includes the signature value and signed information obtained by signing the information such as the public key and the identification information of the MO SubCA 1 with the private key of the MO RootCA. The MO SubCA 2 certificate is a public key certificate of which subject is the MO SubCA 2, of which issuer is the MO SubCA 1, and which includes the signature value and signed information obtained by signing the information such as the public key and the identification information of the MO SubCA 2 with the private key of the MO SubCA 1. The MO SubCA 2 certificate is a public key certificate of which subject is the owner of the EV 100, of which issuer is the MO SubCA 2, and which includes the signature value and signed information obtained by signing the information such as the public key and the identification information of the EV 199 with the private key of the MO SubCA 2.

When the contract certificate chain including the MO SubCA 1 certificate, the MO SubCA 2 certificate, and the contract certificate is provided to the charging station 200 by the EV 100 during the PnC charging process, the SECC 220 validates the integrity of the signed content in the MO SubCA 1 certificate by verifying the signature value of the MO RootCA in the MO SubCA 1 certificate with the public key of the MO RootCA by using the Elliptic Curve Digital Signature Algorithm (ECDSA).

In addition, the SECC 220 validates the integrity of the signed content in the MO SubCA 2 certificate by verifying the signature value of the MO SubCA 1 in the MO SubCA 2 certificate with the public key of the MO SubCA 1. Further, the SECC 220 validates the integrity of the signed content in the contract certificate by verifying the signature value of the MO SubCA 2 in the contract certificate with the public key of the MO SubCA 2.

In such a validation process, if the SECC 220 is not equipped with MO RootCA certificate, the SECC 220 cannot verify the integrity of the MO SubCA 1 certificate. As a result, the SECC 220 cannot verify the integrity of the MO SubCA 2 Certificate and the contract certificate and cannot perform the automatic authentication for the PnC.

In consideration of such an issue, in a cross certification example shown in FIG. 6, a cross certificate that helps to use the V2G RootCA certificate is issued instead of the MO RootCA certificate. In detail, the V2G RootCA signs information such as the public key and the identification information of the MO RootCA with its own private key to issue the cross certificate, for the MO RootCA, containing a signature value and signed information. Here, the V2G RootCA may be a top-level certification authority that serves as a trust anchor for various PKI families. For example, the V2G RootCA may serve as a trust anchor for the Power Device PKI family for various devices to perform power distribution, power demand response (DR), and frequency regulation (FR) operations in a power grid. In addition, the V2G RootCA may serve as a trust anchor for an advanced metering infrastructure (AMI) PKI family. In particular, the V2G RootCA may act as a trust anchor for the CPO PKI family shown in FIG. 2. The subject of the cross certificate issued according to the process of FIG. 6 is the MO RootCA, and the issuer thereof is the V2G RootCA. The cross certificate includes the signature value obtained by signing the information such as the public key and the identification information of the MO RootCA with the private key of the V2G RootCA.

After the cross certificate is issued as such, the contract certificate chain provided by the EV 100 to the charging station 200 during the PnC charging process may include the cross certificate, the MO SubCA 1 certificate, the MO SubCA 2 certificate, and the contract certificate. Even when the SECC 220 is not equipped with the MO RootCA certificate, the SECC 220 equipped with the V2G RootCA certificate can verify the cross certificate based on the V2G RootCA certificate and further verify the contract certificate based on the verification result for the cross certificate. That is, the SECC 220 can validate the integrity of the signed content in the cross certificate by verifying the signature value of the V2G RootCA in the cross certificate with the public key of the V2G RootCA and can acquire the public key of the MO RootCA. Subsequently, the SECC 220 can validate the integrity of the MO SubCA 1 certificate by using the public key of the MO RootCA, and then sequentially validate the integrity of the MO SubCA 2 certificate 1 and the contract certificate.

A cross certificate that may be used instead of the MO RootCA certificate and the MO SubCA 1 Certificate is issued in a cross certification example shown in FIG. 7. The V2G RootCA signs information such as the public key and the identification information of the MO SubCA 1 with its own private key to issue the cross certificate containing the signature value and the signed information. As a result, the subject of the cross certificate issued according to the process of FIG. 7 is the MO SubCA 1, and the issuer thereof is the V2G RootCA. The cross certificate includes the signature value obtained by signing the information such as the public key and the identification information of the MO SubCA 1 with the private key of the V2G RootCA.

After the cross certificate is issued as such, the contract certificate chain provided by the EV 100 to the charging station 200 during the PnC charging process may include the cross certificate, the MO SubCA 2 Certificate, and the contract certificate. The SECC 220 can validate the integrity of the signed content in the cross certificate by verifying the signature value of the V2G RootCA in the cross certificate with the public key of the V2G RootCA and can acquire the public key of the MO SubCA 1. Subsequently, the SECC 220 can validate the integrity of the MO SubCA 2 Certificate by using the public key of the MO SubCA 1, and then validate the integrity of the contract certificate by using the public key of the MO SubCA 2.

In cross certification example shown in FIG. 8, the original contract certificate chain has a length of 2 and includes only the MO SubCA 1 Certificate and the contract certificate. In this example, a cross certificate that may be used instead of the MO RootCA certificate and the MO SubCA 1 Certificate is issued. The V2G RootCA signs information such as the public key and the identification information of the MO SubCA 1 with its own private key to issue the cross certificate containing the signature value and the signed information. As a result, the subject of the cross certificate issued according to the process of FIG. 8 is the MO SubCA 1, and the issuer thereof is the V2G RootCA. The cross certificate includes the signature value obtained by signing the information such as the public key and the identification information of the MO SubCA 1 with the private key of the V2G RootCA.

After the cross certificate is issued as such, the contract certificate chain provided by the EV 100 to the charging station 200 during the PnC charging process may include only the cross certificate and the contract certificate. The SECC 220 can validate the integrity of the signed content in the cross certificate by verifying the signature value of the V2G RootCA in the cross certificate with the public key of the V2G RootCA and can acquire the public key of the MO SubCA 1. Subsequently, the SECC 220 can validate the integrity of the contract certificate by using the public key of the MO SubCA 1.

Figure 9:
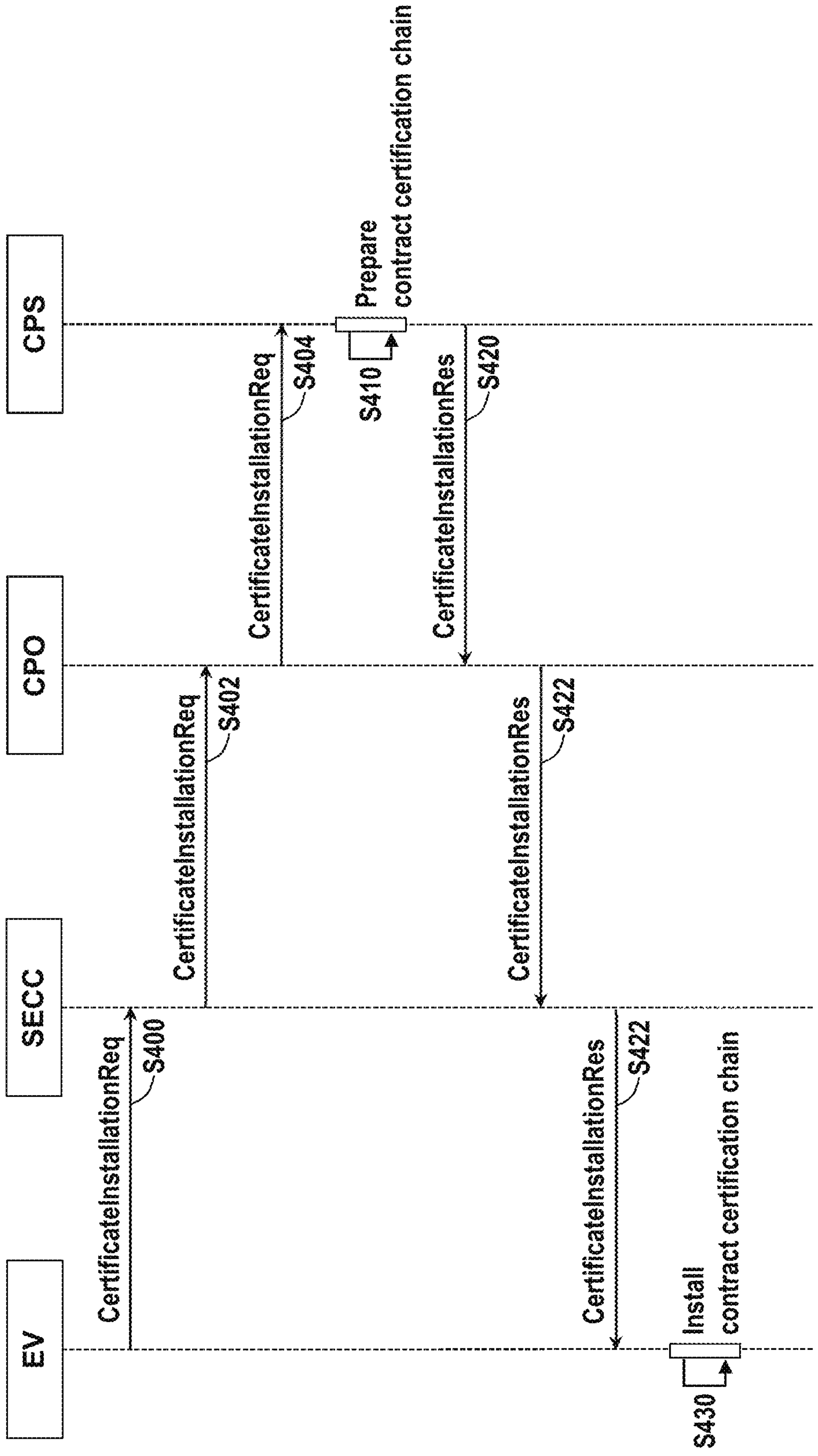
FIG. 9 is a sequence diagram showing a process of installing a cross certificate in the electric vehicle.

FIG. 9 is a sequence diagram showing a process of installing a cross certificate in the EV 100.

If the contract certificate is not stored in the EVCC 120 or the contract certificate stored in the EVCC 120 is not valid due to a reason such as an expiration of the contract certificate, a valid contract certificate should be installed in the EVCC 120. In such a case, the EVCC 120 may request an installation of the contract certificate of the PKI family of the MO that is currently in the contractual relationship with the EV user from the SECC 220 by sending a CertificateInstallationReq message to the SECC 220 (operation 400). At this time, the EVCC 120 may sign the CertificateInstallationReq message with the private key associated with the OEM provisioning certificate before transmitting the message. Typically, the installation of the contract certificate may be accomplished before a charging process starts, because an authentication of the charging process can be started only when a valid contract certificate is installed in the EVCC 120.

Upon receiving the CertificateInstallationReq message from EVCC 120, the SECC 220 may forward the message to a relevant secondary actor. For example, the SECC 220 may transfer the CertificateInstallationReq message to the CPS 320 via the CPO 350 associated with the SECC 220 (operations 402 and 404).

Upon receiving the CertificateInstallationReq message from the EVCC 120, the CPS 320 checks whether there is a contract certificate chain associated with the EVCC 120. Then, the CPS 320 composes a CertificateInstallationRes message including the contract certificate chain (operation 410). The CPS 320 transmits the CertificateInstallationRes message to the EVCC 120 via the CPO 350 and the SECC 220 (operations 420-424). The contract certificate chain transmitted to the EVCC 120 may include the cross certificate. If there are a plurality of contract certificate chains associated with the EVCC 120, the CPS 320 may select at least one contract certificate chain based on priorities determined according to a predetermined rule and insert the selected contract certificate chain into the CertificateInstallationRes message. For example, a contract certificate chain that can be verified by the SECC 220 and that does not include any cross certificate may have a highest priority. Also, when there is no contract certificate that can be verified by the SECC 220 and that does not include any cross certificate, a contract certificate chain including the cross certificate may have a next priority. Meanwhile, in case where there exist a plurality of contract certificate chains associated with the EVCC 120, a parameter indicating a number of remaining certificate chains, e.g. RemainingContractCertificateChains, may be included in the CertificateInstallationRes message.

After receiving the CertificateInstallationRes message, the EVCC 120 may install the received contract certificate chain (operation 430). In addition, if the RemainingContractCertificateChains parameter of the CertificateInstallationRes message is greater than 1 and a maximum number of contract certificates that can be installed in the EVCC 120 has not been reached yet, the EVCC 120 may send another CertificateInstallationReq message so that an additional contract certificate chain may be installed. As the CertificateInstallationReq and CertificateInstallationRes message pairs are repeatedly transmitted and received, a plurality of contract certificates may be installed. In such a case, the contract certificate to be used for a charging station 200 may be determined according to a policy predefined by the OEM.

Although the contract certificate chain including the cross certificate is installed in the EVCC 120 according to the request of the EVCC 120 visiting the charging station 200 in accordance with the embodiment shown in FIG. 9, the contract certificate chain including the cross certificate may be distributed to and installed in all EVs related to the MO 310 with which the EVs 100 have contractual relationships at one time or sequentially regardless of the request of the EVs 100 in an alternative embodiment of the present disclosure.

Figure 10:
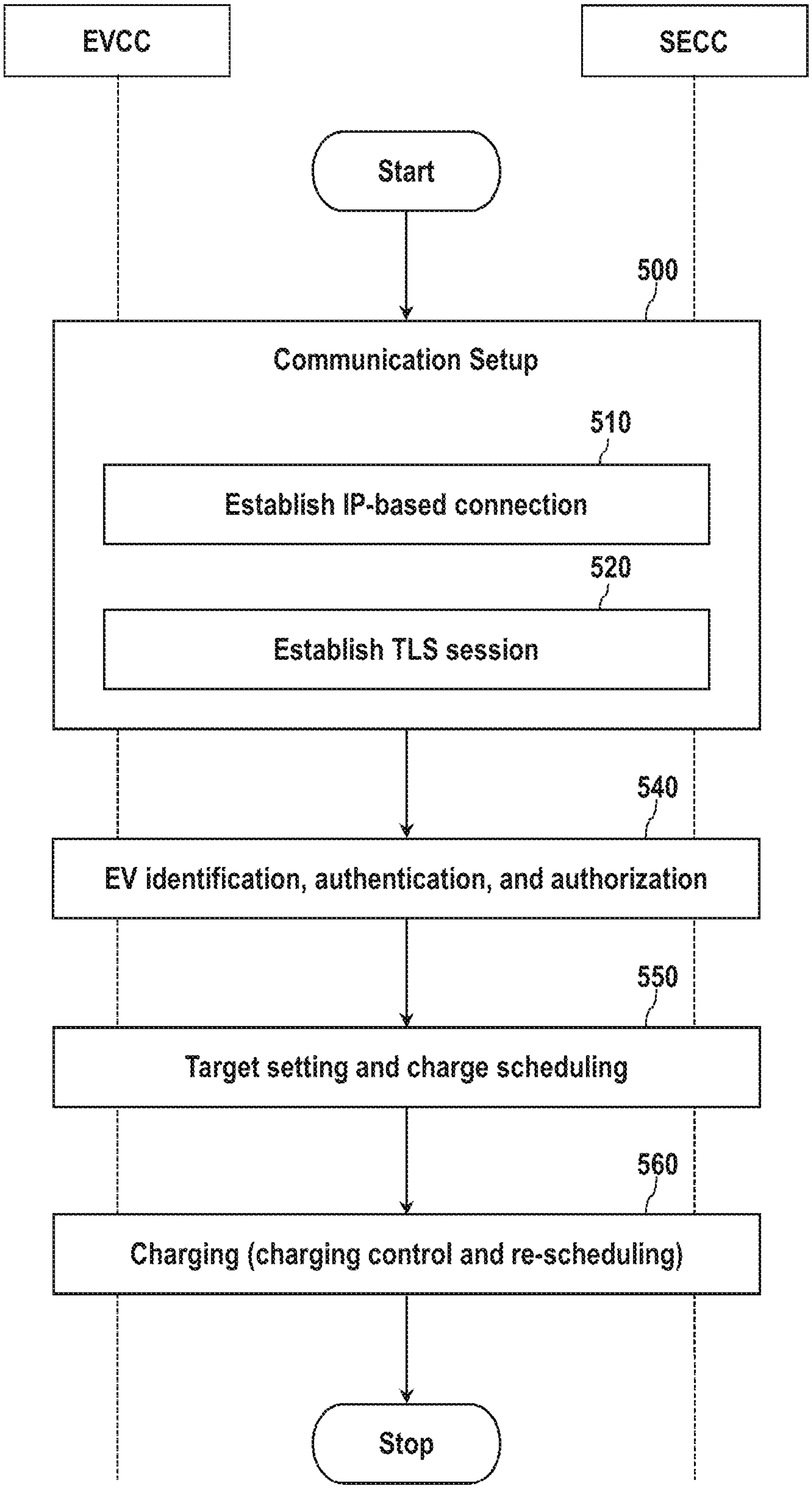
FIG. 10 is a flowchart showing an exemplary embodiment of a communication process between an EVCC and an SECC for a PnC charging.

FIG. 10 is a flowchart showing an exemplary embodiment of a communication process between the EVCC 120 and the SECC 220 for the PnC charging. The PnC charging process shown in the drawing is based on the ISO 15118-2 standard.

First, a communication channel is established between the EVCC 120 and the SECC 220 (operation 500). In the communication setup operation, an IP-based connection is established first between the EVCC 120 and the SECC 220 (operation 510), and then a TLS session, i.e., a secure connection is established between the EVCC 120 and the SECC 220 (operation 520). During a process of establishing the TLS session, the EVCC 120 may receive the SECC certificate chain including the SECC leaf certificate and the CPO SubCA certificates, i.e., the CPO SubCA 1 certificate and the CPO SubCA 2 certificate, from the SECC 220 and verify the SECC leaf certificate using the CPO SubCA certificates and the V2G RootCA certificate stored in the HSM 170.

After the TLS session is established, the EVCC 120 and the SECC 220 may generate a symmetric key to encrypt data using the symmetric key during data exchanges. That is, the EVCC 120 and the SECC 220 exchange messages and data encrypted by the symmetric key in operations 540-560.

In operation 540, an identification, authentication, and authorization for the EVCC 100 are performed. Specifically, the EVCC 100 may provide the contract certificate chain to the SECC 220 through a PaymentDetailsReq message so that the SECC 220 or the CPO 350 may verify the contract certificate and verify the identity of EV 100. At this time, the contract certificate chain transmitted by the EVCC 100 to the SECC 220 may include the MO SubCA certificates, i.e., the MO SubCA 1 Certificate and the MO SubCA 2 Certificate, and may further include the cross certificate in case where the MO RootCA certificate is not stored in the SECC 220. Subsequently, the SECC 200 provides the contract certificate to the MO 310 and requests the authorization of a service for the EV. The MO 310 validates the contract certificate in response to the request of the SECC 200, checks an eMAID account status, determines whether the contract for the EV is valid enough to provide the charging service, and provides an authorization result based on the determination to the SECC 200.

If the authentication and the authorization are completed normally, a target charging level may be determined through a communication between the EVCC 120 and the SECC 220 and a charging schedule including a charging profile may be established (operation 560). The SECC 220 controls the charging of the EV so that the charging is performed until a charging termination condition is satisfied (operation 570). The charging schedule may be adjusted during the charging process. Examples of charging termination conditions may include an accomplishment of the target charging level, a request of the EVCC 100, a decision of the SECC 220 due to insufficient power, and a request of a secondary actor. An adjustment of the charging schedule may be made according to a request of the EV user in the EV or via a secondary actor or an adjustment request entry of the EV user at the EVSE 210, for example, depending on a charging mode. The adjustment of the charging schedule may be performed by a decision of the SECC 220 also based on information or a request from a secondary actor. When the power transfer is completed, the EVCC 120 may request a receipt from the SECC 220, and the SECC 220 may provide a receipt indicating the charge amount in response to the request.

Figure 11:
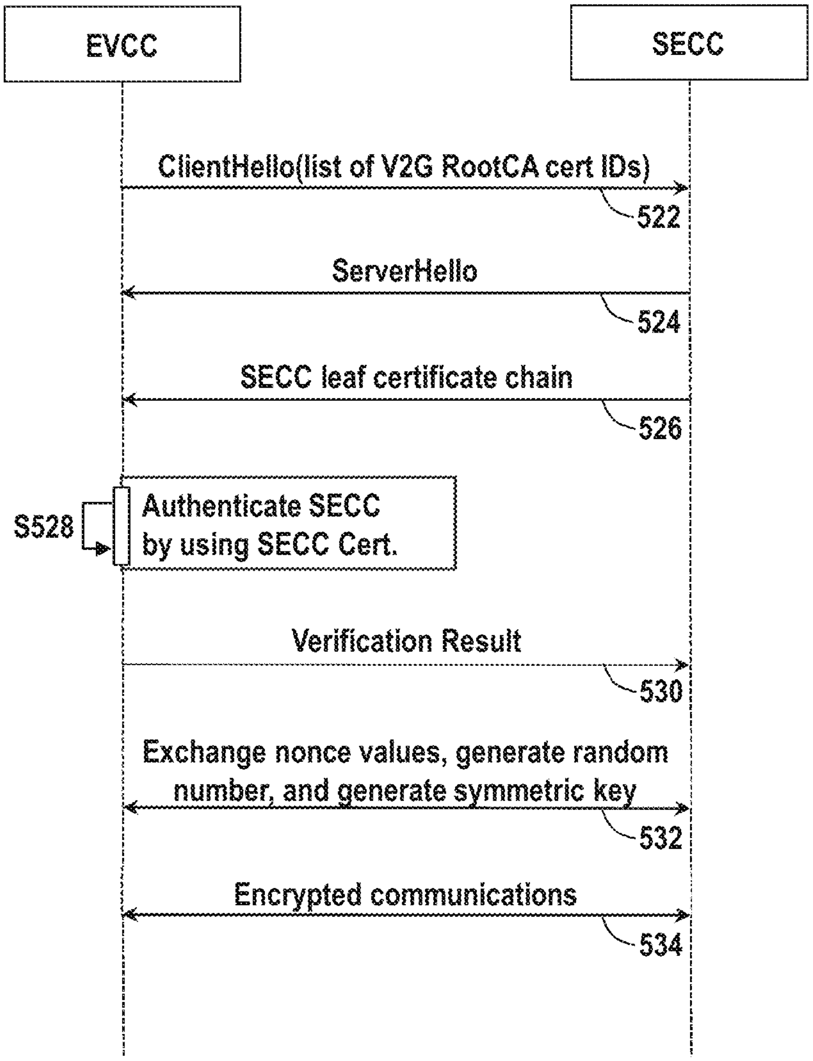
FIG. 11 is a sequence diagram showing in detail a TLS session establishment process shown in FIG. 10 according to an embodiment of the present disclosure.

FIG. 11 is a sequence diagram showing in detail the TLS session establishment process of the operation 520 in FIG. 10 according to a first embodiment of the present disclosure. The TLS session establishment process shown in the drawing is a modification of the process specified in the ISO 15118-2 standard (2014).

Referring to FIG. 11, the EVCC 120 may provide a list of V2G RootCA certificate IDs maintained by the EVCC 120 to the SECC 220 when transmitting a ClientHello message (operation 522). Subsequently, the SECC 220 sends a ServerHello message in response to the ClientHello message and provides the SECC leaf certificate chain to the EVCC 12 (operations 524 and 526). It is desirable that the trust anchor for the CPO SubCA certificates, i.e., the CPO SubCA 1 Certificate and the CPO SubCA 2 Certificate, in the SECC leaf certificate chain is included in a V2G RootCA certificates list provided by the EVCC 120. Afterwards, the EVCC 120 authenticates the SECC 220 by using the SECC leaf certificate (operation 528). After verifying the integrity of the SECC leaf certificate, the EVCC 120 may send a verification result to the SECC 220 (operation 530).

Subsequently, the EVCC 120 may generate a nonce of the EVCC 120 to transmit to the SECC 220, and the SECC 220 may generate a nonce of the SECC 220 to transmit to the EVCC 120. Next, the EVCC 120 may generate a kind of random number called a pre-master secret (PMS), encrypts the PMS value using the public key of the SECC 220 obtained from the SECC leaf certificate, and sends an encrypted PMS value to the SECC 220. Through the exchange of the nonce values and the PMS value, the EVCC 120 and the SECC 220 generate a symmetric key (operation 532). Afterwards, the EVCC 120 and the SECC 220 perform encrypted communications by encrypting data using the symmetric key (operation 534).

Figure 12:
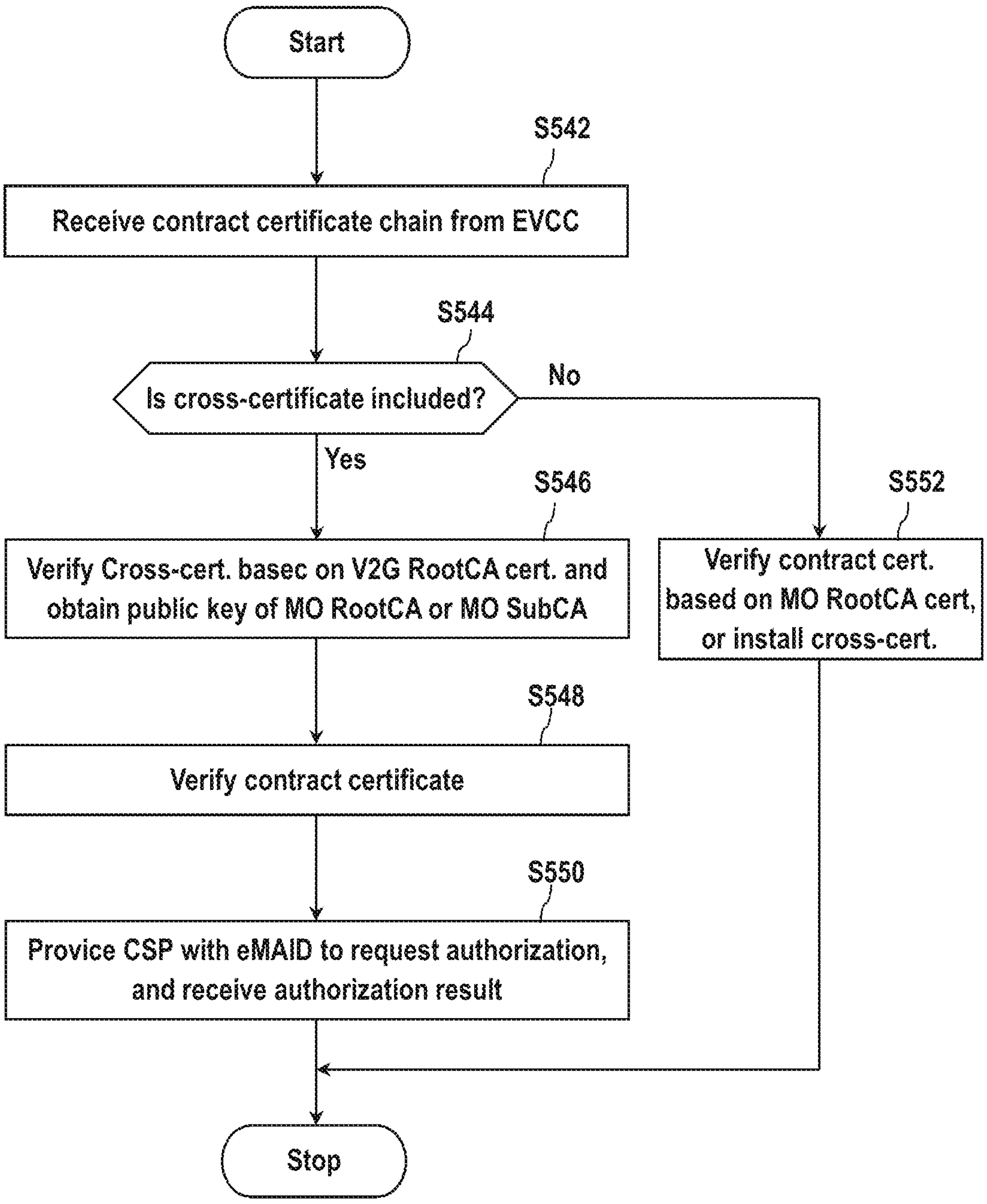
FIG. 12 is a flowchart showing an exemplary embodiment of a process of an identification, authentication, and authorization for the EVCC performed by the SECC.

FIG. 12 is a flowchart showing an exemplary embodiment of a process of the operation 540 shown in FIG. 10, i.e., the identification, authentication, and authorization process for the EVCC 100 performed by the SECC 220.

First, the SECC 220 may receive the contract certificate chain from the EVCC 100 (operation 542). After receiving the contract certificate chain, the SECC 220 may determine whether the cross certificate is included in the contract certificate chain (operation 544). If the cross certificate is included in the contract certificate chain, the SECC 220 verifies the cross certificate based on the V2G RootCA certificate and obtains a public key of the MO RootCA or one of the MO SubCAs (i.e., the MO SubCA 1 or MO SubCA 2) (operation 546). The SECC 220 may verify the contract certificate based on the public key of the MO SubCA 2 (operation 548). Subsequently, the SECC 220 provides the contract certificate to the MO 310 to request an authorization of the EV, so that the MO 310 checks the validity of the contract certificate and the status of the eMAID account and determines whether the contract for the EV is effective enough to be suitable for providing the charging service. Then, the SECC 220 receives an authorization result from the MO 310 (operation 550).

Meanwhile, if the cross certificate is not included in the contract certificate chain in the operation 544, the SECC 220 may check whether the MO RootCA certificate is stored in the hardware security module (HSM) 270. If the MO RootCA certificate is stored in the HSM 270, the SECC 220 may verify the contract certificate based on the MO RootCA certificate. On the other hand, if the MO RootCA certificate is not stored in the HSM 270, the SECC 220 may transmit the contract certificate to a backend server of the charger so that the backend server may verify the contract certificate. Meanwhile, the SECC 220 may make the cross certificate to be installed in the EV 100 (operation 552).

Figure 13:
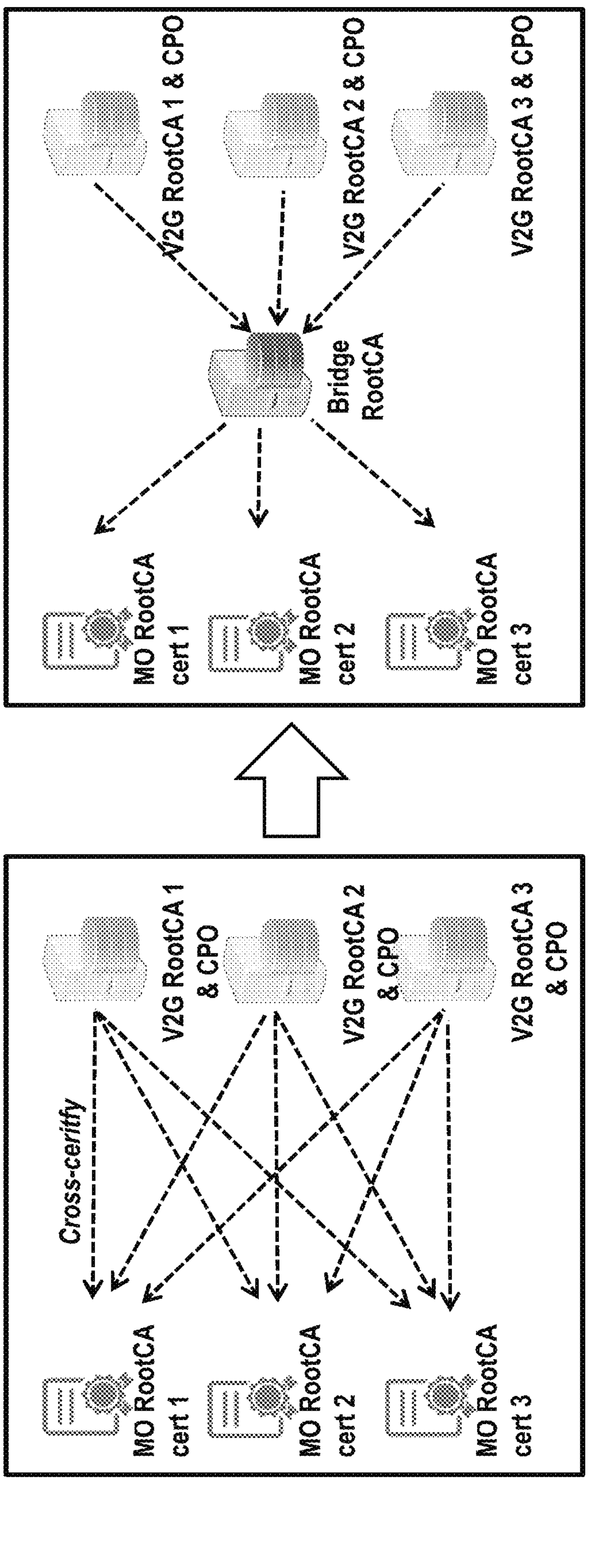
FIG. 13 is a schematic diagram of a cross certification system according to another embodiment of the present disclosure.

FIG. 13 is a schematic diagram of a cross certification system according to another embodiment of the present disclosure.

As described above, when there are a plurality of MO operators in the market, the V2G RootCA may cross-certify each of the plurality of MO RootCA certificates to solve the problem caused by an absence of the corresponding MO RootCA certificate in the charging station 200. However, when there are also a plurality of V2G RootCAs in the market, a cross certificate may have to be issued for each combination of one V2G RootCA and one MO RootCA certificate. Assuming that there are m V2G RootCAs in the market and n MO RootCA certificates, for example, the number of the cross certificates that may be issued by the cross-certifications of the MO RootCA certificates by the V2G RootCAs may reach up to mn. In such a case, not only the cross-certification task is complicated, but also the number of the cross certificates is excessively large and the load on the memory of the EV 100 for storing the large number of the cross certificates increases.

In view of this, according to an exemplary embodiment, a bridge RootCA may perform the issuance of the cross certificates on behalf of the V2G RootCAs. According to such an embodiment, when there are m V2G RootCAs in the market and n MO RootCA certificates as in the example above, the number of the cross certificates that may be issued by the cross-certifications of bridge CA certificates by the V2G RootCAs and the cross-certifications of the MO RootCA certificates by the bridge CAs is limited to a maximum of m+n. Among the (m+n) cross certificates, the Certificates that must be stored in each EV are just two, i.e., a cross certificate issued by one of the V2G RootCA to the bridge CA and a cross certificate issued by the bridge CA to one of the MO family CA. According to this embodiment, the number of the cross certificate is not excessively large and the load on the memory of the EV 100 is reduced.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. An electric vehicle authentication method for providing plug-and-charge (PnC) charging to an electric vehicle in a charging station, the electric vehicle authentication method being performed by at least one of an electric vehicle supply equipment (EVSE) or a charge point operator (CPO), comprising:

receiving, from the electric vehicle, a contract certificate chain including a contract certificate issued based on a first root certificate authority (RootCA) certificate of a mobility operator (MO) having a contract with a user of the electric vehicle; and verifying a cross certificate included in the contract certificate chain, based on a second RootCA certificate of a vehicle-to-grid (V2G) RootCA being trusted by the CPO or the EVSE; and verifying the contract certificate based on a verification result for the cross certificate, wherein the cross certificate is cross certified by the V2G RootCA.

2. The electric vehicle authentication method of claim 1, wherein the contract certificate chain further includes a second cross certificate issued based on a third certificate authority (CA) certificate cross certified by the V2G RootCA, wherein the third CA cross certifies the cross certificate.

3. The electric vehicle authentication method of claim 2, wherein verifying the cross certificate comprises:

verifying the second cross certificate based on the second RootCA; and verifying the cross certificate based on a verification result for the second cross certificate.

4. The electric vehicle authentication method of claim 1, further comprising:

requesting an authorization from a settlement server by transmitting predetermined subject identification information in the contract certificate to the settlement server; and receiving an authorization result from the settlement server and enabling a charging according to the authorization result.

5. An electric vehicle supply equipment (EVSE) configured to provide plug-and-charge (PnC) charging to an electric vehicle (EV), comprising:

a memory storing program instructions; and a processor coupled to the memory and executing the program instructions stored in the memory, wherein the program instructions, when executed by the processor, causes the processor to:

receive, from the electric vehicle, a contract certificate chain including a contract certificate issued based on a first root certificate authority (RootCA) certificate of a mobility operator (MO) having a contract with a user of the electric vehicle; and verify a cross certificate is included in the contract certificate chain, based on a second RootCA certificate of a vehicle-to-grid (V2G) RootCA being trusted by the EVSE; and verify the contract certificate based on a verification result for the cross certificate, wherein the cross certificate is cross certified by the V2G RootCA.

6. The EVSE of claim 5, wherein the contract certificate chain further includes a second cross certificate issued based on a third certificate authority (CA) certificate cross certified by the V2G RootCA, wherein the third CA cross certifies the cross certificate.

7. The EVSE of claim 5, wherein the processor is further configured to:

verify the second cross certificate based on the second RootCA; and verify the cross certificate based on a verification result for the second cross certificate.

8. The EVSE of claim 5, wherein the program instructions are further configured to cause the processor to:

request an authorization from a settlement server by transmitting predetermined subject identification information in the contract certificate to the settlement server; and receive an authorization result from the settlement server and enable a charging according to the authorization result.

* * * * *